US011536197B2

United States Patent
Tateishi et al.

(10) Patent No.: US 11,536,197 B2
(45) Date of Patent: Dec. 27, 2022

(54) VALVE OPENING DEGREE DETERMINATION DEVICE FOR COOLING-AIR ADJUSTMENT VALVE, DISK CAVITY TARGET TEMPERATURE DETERMINATION DEVICE, AND DISK CAVITY TEMPERATURE CONTROL DEVICE

(71) Applicant: Mitsubishi Power, Ltd., Yokohama (JP)

(72) Inventors: Koki Tateishi, Tokyo (JP); Shinichi Yoshioka, Yokohama (JP); Hironao Nagai, Yokohama (JP); Ryuji Takenaka, Yokohama (JP); Koshiro Fukumoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/978,049

(22) PCT Filed: Apr. 11, 2019

(86) PCT No.: PCT/JP2019/015783
§ 371 (c)(1),
(2) Date: Sep. 3, 2020

(87) PCT Pub. No.: WO2019/198793
PCT Pub. Date: Oct. 17, 2019

(65) Prior Publication Data
US 2021/0040889 A1    Feb. 11, 2021

(30) Foreign Application Priority Data
Apr. 13, 2018  (JP) ............................. JP2018-077846

(51) Int. Cl.
*F02C 7/18* (2006.01)
*F02C 9/18* (2006.01)
(Continued)

(52) U.S. Cl.
CPC ................ *F02C 7/18* (2013.01); *F01D 5/081* (2013.01); *F02C 9/18* (2013.01); *F02C 6/08* (2013.01); *F05D 2270/303* (2013.01)

(58) Field of Classification Search
CPC ..................................................... F01D 5/081
See application file for complete search history.

(56) References Cited

U.S. PATENT DOCUMENTS 5,157,914 A * 10/1992 Schwarz ................. F01D 5/081
60/795
6,155,038 A    12/2000 Irwin et al.
(Continued)

FOREIGN PATENT DOCUMENTS

CN    105917097    8/2016
JP    62-107203    5/1987
(Continued)

OTHER PUBLICATIONS

International Search Report dated Jul. 2, 2019 in corresponding International (PCT) Patent Application No. PCT/JP2019/015783.
(Continued)

*Primary Examiner* — Katheryn A Malatek
(74) *Attorney, Agent, or Firm* — Wenderoth, Lind & Ponack, LLP

(57) ABSTRACT

A valve opening degree determination device includes an object operating state acquisition unit configured to acquire an object operating state which is an operating state of a gas turbine before control, and a valve opening degree calculation unit configured to calculate the valve opening degree such that a disk cavity temperature after control is equal to
(Continued)

or lower than a target temperature, based on the object operating state. The valve opening degree calculation unit is configured to determine an input value of the valve opening degree such that a prediction value of the disk cavity temperature is equal to or lower than the target temperature as the valve opening degree, based on a prediction model generated based on a plurality of previous data in which the operating state, the disk cavity temperature, and an actual opening degree of the cooling-air adjustment valve previously acquired are associated with each other.

25 Claims, 16 Drawing Sheets

(51) Int. Cl.
    *F01D 5/08* (2006.01)
    *F02C 6/08* (2006.01)

(56) References Cited

U.S. PATENT DOCUMENTS

| 2006/0277915 | A1* | 12/2006 | Iwasaki | F23R 3/26 |
| | | | | 60/772 |
| 2013/0131951 | A1* | 5/2013 | Pandey | F02C 9/52 |
| | | | | 701/100 |
| 2013/0152601 | A1* | 6/2013 | Bacic | F02C 9/18 |
| | | | | 60/782 |
| 2013/0152602 | A1* | 6/2013 | Bacic | F01D 17/085 |
| | | | | 60/782 |
| 2014/0058534 | A1 | 2/2014 | Tiwari et al. | |
| 2015/0240726 | A1 | 8/2015 | Smith et al. | |
| 2016/0326878 | A1 | 11/2016 | Morimoto et al. | |
| 2017/0191420 | A1* | 7/2017 | Clarke | F01D 17/085 |
| 2018/0010520 | A1* | 1/2018 | Iwasaki | F01D 25/12 |

FOREIGN PATENT DOCUMENTS

| JP | 05-171958 | 7/1993 |
| JP | 10-116105 | 5/1998 |
| JP | 2000-186508 | 7/2000 |
| JP | 3100723 | 10/2000 |
| JP | 2013-057278 | 3/2013 |
| JP | 2015-145644 | 8/2015 |
| JP | 2015-172369 | 10/2015 |
| JP | 2015-530652 | 10/2015 |
| JP | 2018-055169 | 4/2018 |
| WO | 2015/115625 | 8/2015 |

OTHER PUBLICATIONS

International Preliminary Report on Patentability dated Oct. 22, 2020 in corresponding International (PCT) Patent Application No. PCT/JP2019/015783, with English Translation.
Office Action dated Jun. 22, 2022 in Chinese Application No. 201980011597.0 with Machine Translation.

* cited by examiner

FIG. 5C (a) Target temperature map Ft

|  |  | Intake air temperature Ta [°C] | | | | | | | | | |
|---|---|---|---|---|---|---|---|---|---|---|---|
| | | y1 | y2 | y3 | y4 | y5 | y6 | y7 | y8 | y9 | y10 |
| Vane opening degree Vp of IGV75[%] | x1 | | | | | | | | | | |
| | x2 | | | | | | | | | | |
| | x3 | | | | | | | | | | |
| | x4 | | | | | | | | | | |
| | x5 | | | | Target opening degree Tt of | | | | | | |
| | x6 | | | | cooling-air adjustment valve 92 | | | | | | |
| | x7 | | | | | | | | | | |
| | x8 | | | | | | | | | | |
| | x9 | | | | | | | | | | |
| | x10 | | | | | | | | | | | x points in total y points in total

⬇

(b) Opening degree map Fd

|  |  | Intake air temperature Ta [°C] | | | | | | | | | |
|---|---|---|---|---|---|---|---|---|---|---|---|
| | | y1 | y2 | y3 | y4 | y5 | y6 | y7 | y8 | y9 | y10 |
| Vane opening degree Vp of IGV75[%] | x1 | | | | | | | | | | |
| | x2 | | | | | | | | | | |
| | x3 | | | | | | | | | | |
| | x4 | | | | | | | | | | |
| | x5 | | | | Determined opening degree Db of | | | | | | |
| | x6 | | | | cooling-air adjustment valve 92 | | | | | | |
| | x7 | | | | | | | | | | |
| | x8 | | | | | | | | | | |
| | x9 | | | | | | | | | | |
| | x10 | | | | | | | | | | | x points in total y points in total

Method for determining opening degree of cooling-air adjustment valve

Disk cavity target temperature method

VALVE OPENING DEGREE DETERMINATION DEVICE FOR COOLING-AIR ADJUSTMENT VALVE, DISK CAVITY TARGET TEMPERATURE DETERMINATION DEVICE, AND DISK CAVITY TEMPERATURE CONTROL DEVICE

TECHNICAL FIELD

The present disclosure relates to control of a cooling-air adjustment valve for adjusting supply of cooling air for cooling a disk cavity of a gas turbine.

BACKGROUND

Generally, a gas turbine includes a compressor, a combustor, and a turbine. The compressor compresses air (intake air) sucked in from an air inlet to produce compressed air having high temperature and high pressure. The combustor supplies fuel to the compressed air and combusts the fuel to produce combustion gas having high temperature and high pressure. The turbine is driven by the combustion gas and drives a coaxially connected generator. Specifically, a plurality of rotor blades constituting a turbine rotor in a turbine casing and a plurality of stator vanes disposed in the turbine casing are alternately arranged along the flow direction of the combustion gas to form stages, and the combustion gas produced by the combustor passes through each stage of the rotor blades and the stator vanes to rotationally drive the turbine rotor. With rotation of the turbine rotor, the generator connected to the turbine rotor is driven to generate power.

In the gas turbine, the compressed air produced by the compressor is partially bled and used as cooling air for cooling the stator vanes, rotor blades, and turbine disks of the turbine. The cooling air is also introduced into a disk cavity (space) at the tip of a sealing member disposed between turbine disks adjacent each other in the flow direction for preventing inflow of the combustion gas from a gas flow passage through which the combustion gas mainly flows. By controlling the cooling air introduced into the disk cavity by the opening degree of a valve (cooling-air adjustment valve), the temperature of the disk cavity is kept below a temperature limit.

Specifically, the supply amount of the cooling air is adjusted by controlling the valve based on a measurement value of the temperature of the disk cavity (see Patent Documents 1 and 2), or the temperature of the cooling air is adjusted by controlling the valve based on the temperature of the air sucked in the compression section or the output power of the generator (see Patent Document 3) to keep the temperature of the disk cavity below a temperature limit. The turbine disk is a disk-shaped member on which rotor blades fixed to a portion of the turbine rotor are implanted. The temperature limit is a temperature at which damage does not occur in each portion.

CITATION LIST

Patent Literature

Patent Document 1: JP2015-145644
Patent Document 2: JPH5-171958A
Patent Document 3: JP2013-57278A

SUMMARY

Problems to be Solved

The cooling of the disk cavity is performed by, in addition to cooling effect of the cooling air having a lower temperature than the combustion gas, mainly preventing the inflow of the combustion gas (hot gas) produced by the combustor into the disk cavity by the pressure. Specifically, the cooling air is used as sealing air which is discharged to the gas flow passage and mixed into the hot gas while preventing the inflow of the hot gas. Accordingly, when the cooling air introduced into the disk cavity is reduced as much as possible, the amount of the cooling air mixed as a result of sealing into the hot gas for driving the turbine is reduced. Thus, a reduction in temperature of the hot gas due to the cooling air can be suppressed, and the performance of the gas turbine is expected to be improved.

However, the use of the air bled from the compressor causes the pressure of the cooling air to change non-linearly depending on the operating state of the gas turbine. Accordingly, in the turbine, when pressure balance between the hot gas on the gas flow passage side and the cooling air on the cooling passage side, which are opposed across the seal member, changes so that the pressure of the hot gas is higher than the pressure of the cooling air, the hot gas flows back to the disk cavity. Further, when the hot gas flows into the disk cavity, the temperature of the disk cavity rapidly increases. Such pressure balance is also affected by aging change such as change of a gap of the seal member sealed by the cooling air. In order to reliably avoid a rapid increase in temperature of the disk cavity due to the backflow of the hot gas, it is conceivable to excessively introduce the cooling air to the disk cavity. However, the excess of the cooling air decreases the temperature of the hot gas and thus reduce the performance of the gas turbine.

In view of the above, an object of at least one embodiment of the present invention is to provide a valve opening degree determination device for a cooling-air adjustment valve whereby it is possible to improve the performance of the gas turbine while appropriately cooling the disk cavity.

Solution to the Problems (1) A valve opening degree determination device for a cooling-air adjustment valve according to at least one embodiment of the present invention is a device for determining a valve opening degree of the cooling-air adjustment valve for controlling supply of a cooling air for cooling a disk cavity of a gas turbine, comprising: an object operating state acquisition unit configured to acquire an object operating state which is an operating state of the gas turbine before control; and a valve opening degree calculation unit configured to calculate the valve opening degree such that a disk cavity temperature which is a temperature of the disk cavity after control is equal to or lower than a target temperature, based on the object operating state. The valve opening degree calculation unit is configured to determine an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and an input value of the valve opening degree. The prediction model is generated based on a plurality of previous data in which the operating state, the disk cavity temperature, and an actual opening degree of the cooling-air adjustment valve previously acquired are associated with each other.

With the above configuration (1), the relationship between the disk cavity temperature and the actual opening degree of the cooling-air adjustment valve in any operating state of the gas turbine is accumulated, and the prediction model for calculating the prediction value of the disk cavity temperature at a given valve opening degree of the cooling-air adjustment valve in a given operating state is previously generated based on the accumulated previous data. Further, the valve opening degree of the cooling-air adjustment valve such that the prediction value of the disk cavity temperature obtained from the prediction model becomes the target temperature is determined based on the operating state (object operating state) at the time when new valve opening degree (hereinafter, determined opening degree) of the cooling-air adjustment valve is determined.

Thus, before the influence of the operating state which may change over time is reflected in the disk cavity temperature, it is possible to determine the determined opening degree of the cooling-air adjustment valve according to the operating state in a feedforward manner. As a result, the cooling air can be appropriately introduced into the disk cavity, and the disk cavity can be appropriately cooled while improving the performance of the gas turbine.

(2) In some embodiments, in the above configuration (1), the valve opening degree calculation unit includes: an opening degree map retention unit retaining an opening degree map defining the valve opening degree that allows the prediction value of the disk cavity temperature to be equal to or lower than the target temperature for each operating state, the opening degree map being generated based on the prediction model; and a calculation unit configured to calculate the valve opening degree based on the object operating state and the opening degree map.

With the above configuration (2), the valve opening degree of the cooling-air adjustment valve according to expected operating states and target temperatures is previously calculated using the prediction model to previously generate the opening degree map for obtaining the determined opening degree of the cooling-air adjustment valve from the object operating state. With this opening degree map, the determined opening degree of the cooling-air adjustment valve according to the object operating state and the target temperature is determined. Thus, the determined opening degree of the cooling-air adjustment valve according to the object operating state and the target temperature can be directly obtained from the opening degree map. Consequently, it is possible to determine the valve opening degree of the cooling-air adjustment valve in a short time after the object operating state is obtained. In other words, it is possible to determine whether the disk cavity temperature calculated from the valve opening degree of the cooling-air adjustment valve and the object operating state using the prediction model is equal to or lower than the target temperature, directly from the suitable opening degree map without unidirectionally searching the valve opening degree of the cooling-air adjustment valve as variable, for instance.

(3) In some embodiments, in the above configuration (2), the opening degree map retention unit includes: a first opening degree map retention unit retaining a first opening degree map which is the opening degree map generated at a reference time; and an opening degree correction map retention unit retaining an opening degree correction map indicating a difference between the first opening degree map and a second opening degree map which is the opening degree map generated after the reference time. The calculation unit of the valve opening degree calculation unit is configured to calculate the valve opening degree, based on the first opening degree map and the opening degree correction map.

With the above configuration (3), the determined opening degree of the cooling-air adjustment valve is determined using the first opening degree map and the opening degree correction map equivalent to the second opening degree map. Thus, when a value (correction value) defined by the opening degree correction map is greater than expected, for instance, by re-learning the prediction model, it is possible to easily initialize to the first opening degree map (at reference time) while maintaining the prediction accuracy of the prediction model, so that the reliability of control of the gas turbine based on the prediction can be maintained. Further, when a part of the first opening degree map is different from the second opening degree map, the opening degree correction map may be generated for only the different part as appropriate. Thus, it is possible to appropriately improve the calculation accuracy of the determined opening degree.

(4) In some embodiments, in any one of the above configurations (1) to (3), the prediction model is generated by learning the plurality of previous data.

With the above configuration (4), it is possible to improve the prediction accuracy of the disk cavity temperature by performing machine learning or deep learning using the plurality of previous data serving as teaching data.

(5) In some embodiments, in any one of the above configurations (1) to (4), the prediction model is a probability distribution model for obtaining the prediction value of the disk cavity temperature based on probability distribution, and a probability that the prediction value based on the probability distribution is equal to or higher than the target temperature does not exceed a predetermined probability.

With the above configuration (5), it is possible to appropriately obtain the prediction value of the disk cavity temperature.

(6) In some embodiments, in any one of the above configurations (1) to (5), the valve opening degree determination device further comprises: a previous data generation unit configured to generate the plurality of previous data; and a previous data storage unit configured to store the plurality of previous data generated by the previous data generation unit. The previous data storage unit includes: a selective management history storage unit configured to store selective management data which is operating history data as a candidate of the plurality of previous data and has data of the disk cavity temperature exceeding a temperature limit of the disk cavity temperature; and a normal management history storage unit configured to store normal management data which is operating history data other than the selective management data.

With the above configuration (6), since the selective management data and the normal management data are separately stored, it is possible to perform flexible management according to the type of data, for example, management with different policies. Thus, effective improvement of the accuracy of the prediction model also enables generation of the previous data.

(7) In some embodiments, in the above configuration (6), the previous data generation unit includes: an operating history data acquisition unit configured to acquire the operating history data; a selective management history processing unit configured to record the selective management data in the selective management history storage unit; a normal management history processing unit configured to record the normal management data in the normal management history storage unit; a management area identification unit configured to identify a management area of the selective management history storage unit in which the selective management data is to be stored, or identify a management area of the normal management history storage unit in which the normal management data is to be stored, based on at least one data of the disk cavity temperature or the operating state included in at least one of the selective management data or the normal management data; and a data number management unit configured to manage the number of at least one of the selective management data or the normal management data in each management area to a predetermined number or less from latest data.

With the above configuration (7), for instance, the selective management data is stored unconditionally, and the normal management data is stored in each management area according to the contents thereof such that each management area stores a predetermined number or less of operating history data from the latest one. As a result, since importance is placed on the selective management data, the situation where the disk cavity temperature exceeds the temperature limit is reliably prevented, and the prediction model is generated based on the latest operating history data. Thus, it is possible to generate the prediction model in consideration of aging change of the gas turbine. Further, since the number of operating history data in each management area is limited, the influence of old data can be eliminated. Thus, it is possible to improve the prediction accuracy of the prediction model. The same management as applied to the normal management data may be applied to the selective management data.

(8) In some embodiments, in the above configuration (7), at least one of the selective management history processing unit or the normal management history processing unit is configured to, if the operating history data being the selective management data or the normal management data whose management area is identified by the management area identification unit satisfies a predetermined data addition condition, record the operating history data satisfying the predetermined data addition condition in the previous data storage unit. The data addition condition includes that the management area storing first operating history data is different from the management area of second operating history data acquired by the operating history data acquisition unit within a predetermined time or n-th acquisition after the first operating history data is acquired, where n is an integer.

With the above configuration (8), for at least one of the selective management data or the normal management data, the management data satisfying the predetermined data addition condition is stored, and selection is made such that data is not continuously stored in the same management area, for instance. Accordingly, it is possible to improve the diversity of the operating history data stored in the same management area, and it is possible to improve the prediction accuracy of the prediction model.

(9) In some embodiments, in the above configuration (7) or (8), the valve opening degree determination device further comprises: a feedback control unit configured to perform feedback control to determine an adjustment opening degree for adjusting the valve opening degree, based on a deviation between the target temperature and a measurement value of the disk cavity temperature. The previous data generation unit further includes a setting filter that allows only the operating history data acquired when the target temperature settles and the feedback control settles to pass through. The operating history acquisition unit is configured to acquire the operating history data that has passed through the setting filter.

With the above configuration (9), it is possible to obtain valid operating history data for generating the prediction model. Thus, it is possible to improve the prediction accuracy of the prediction model.

(10) In some embodiments, in any one of the above configurations (1) to (9), the operating state includes at least one of a vane opening degree of an inlet guide vane, an intake air temperature, an output power, or a pressure in a compressor casing.

With the above configuration (10), it is possible to appropriately determine the valve opening degree of the cooling-air adjustment valve, based on at least one of the vane opening degree of the inlet guide vane, the intake air temperature, the output power, or the pressure in the compressor casing.

(11) A disk cavity target temperature determination device according to at least one embodiment of the present invention is a device for determining a target temperature of a disk cavity temperature which is a temperature of a disk cavity of a gas turbine used for determining a valve opening degree of a cooling-air adjustment valve for controlling supply of a cooling air for cooling the disk cavity, comprising: an object operating state acquisition unit configured to acquire an object operating state which is an operating state of the gas turbine before control; and a target temperature calculation unit configured to calculate the target temperature, based on the object operating state. The target temperature calculation unit is configured to determine an input value of the disk cavity temperature such that a loss-of-control probability of the gas turbine in the object operating state is equal to or lower than a predetermined probability as the target temperature, based on a classification model for obtaining the loss-of-control probability with an input value of the operating state and an input value of the disk cavity temperature. The classification model is generated based on a plurality of previous data in which controllability of the gas turbine is associated with the operating state and the disk cavity temperature previously acquired.

With the above configuration (11), the disk cavity temperature in any operating state of the gas turbine is accumulated, and the classification model for calculating a probability that the gas turbine is out of control (loss-of-control probability) at a given disk cavity temperature in a given operating state is previously generated based on the accumulated data. Further, given disk cavity temperature and operating state (object operating state) at the time of determining the target temperature are input, and the disk cavity temperature such that the loss-of-control probability calculated by the classification model is equal to or lower than the predetermined probability is determined as the target temperature. Herein, the loss-of-control indicates a state where the disk cavity temperature exceeds the temperature limit even with control by the target temperature of the disk cavity temperature, or a state where the disk cavity temperature is not settled to the target temperature even with control of the valve opening degree of the cooling-air adjustment valve such that the disk cavity temperature becomes the target temperature (control hunting). The controllability is determined based on this probability to determine the target temperature. Thus, before the influence of the operating state which may change over time is reflected in the disk cavity temperature, it is possible to determine the target temperature according to the operating state in a feedforward manner. Accordingly, for instance, by controlling the valve opening degree of the cooling-air adjustment valve in a feedback manner such that the disk cavity temperature becomes the target temperature adjusted according to the operating state, it is possible to reliably prevent the occurrence of loss-of-control of the gas turbine.

(12) In some embodiments, in the above configuration (11), the target temperature calculation unit includes: a target temperature map retention unit retaining a target temperature map defining the target temperature that allows the loss-of-control probability to be equal to or lower than the predetermined probability for each operating state, the target temperature map being generated based on the classification model; and a calculation unit configured to calculate the target temperature based on the object operating state and the target temperature map.

With the above configuration (12), as with the above configuration (2), the target temperature according to the object operating state can be directly obtained from the target temperature map, so that it is possible to determine the target temperature in a short time after the object operating state is obtained.

(13) In some embodiments, in the above configuration (12), the target temperature map retention unit includes: a first target temperature map retention unit retaining a first target temperature map which is the target temperature map generated at a reference time; and a target temperature correction map retention unit retaining a target temperature correction map indicating a difference between the first target temperature map and a second target temperature map which is the target temperature map generated after the reference time. The calculation unit of the target temperature calculation unit is configured to calculate the target temperature, based on the first target temperature map and the target temperature correction map.

With the above configuration (13), as with the above configuration (3), when a value (correction value) defined by the target temperature correction map is greater than expected, for instance, by re-learning the classification model, it is possible to easily initialize to the first target temperature map (at reference time) while maintaining the prediction accuracy of the target temperature map, so that the reliability of control of the gas turbine based on the prediction can be maintained.

(14) In some embodiments, in any one of the above configurations (11) to (13), the classification model is generated by learning the plurality of previous data.

With the above configuration (14), by performing machine learning or deep learning using the plurality of previous data serving as teaching data, it is possible to improve the prediction accuracy of the disk cavity temperature such that the loss-of-control probability that the gas turbine is out of control is equal to or lower than the predetermined value.

(15) In some embodiments, in any one of the above configurations (11) to (14), the disk cavity target temperature determination device further comprises: a previous data generation unit configured to generate the plurality of previous data; and a previous data storage unit configured to store the plurality of previous data generated by the previous data generation unit. The previous data storage unit includes: a selective management history storage unit configured to store selective management data which is operating history data as a candidate of the plurality of previous data and has data of the disk cavity temperature exceeding a temperature limit of the disk cavity temperature; and a normal management history storage unit configured to store normal management data which is operating history data other than the selective management data.

With the above configuration (15), the same effect is achieved as in the above (6).

(16) In some embodiments, in the above configuration (15), the previous data generation unit includes: an operating history data acquisition unit configured to acquire operating history data which is a candidate of the plurality of previous data; a selective management history processing unit configured to record the selective management data in the selective management history storage unit; a normal management history processing unit configured to record the normal management data in the normal management history storage unit; a management area identification unit configured to identify a management area of the selective management history storage unit in which the selective management data is to be stored, or identify a management area of the normal management history storage unit in which the normal management data is to be stored, based on at least one data of the disk cavity temperature or the operating state included in at least one of the selective management data or the normal management data; and a data number management unit configured to manage the number of at least one of the selective management data or the normal management data in each management area to a predetermined number or less from latest data.

With the above configuration (16), as with the above configuration (7), since importance is placed on the selective management data, the situation where the disk cavity temperature exceeds the temperature limit is reliably prevented, and the classification model is generated based on the latest operating history data. Thus, it is possible to generate the classification model in consideration of aging change of the gas turbine. Further, since the number of operating history data in each management area is limited, the influence of old data can be eliminated. Thus, it is possible to improve the prediction accuracy of the classification model.

(17) In some embodiments, in the above configuration (16), at least one of the selective management history processing unit or the normal management history processing unit is configured to, if the operating history data being the selective management data or the normal management data whose management area is identified by the management area identification unit satisfies a predetermined data addition condition, record the operating history data satisfying the predetermined data addition condition in the previous data storage unit. The data addition condition includes that the management area storing first operating history data is different from the management area of second operating history data acquired by the operating history data acquisition unit within a predetermined time or n-th acquisition after the first operating history data is acquired, where n is an integer.

With the above configuration (17), for at least one of the selective management data or the normal management data, the management data satisfying the predetermined data addition condition is stored, and selection is made such that data is not continuously stored in the same management area, for instance. Accordingly, it is possible to improve the diversity of the operating history data stored in the same management area, and it is possible to improve the prediction accuracy of the classification model.

(18) In some embodiments, in any one of the above configurations (11) to (17), the operating state includes at least one of a vane opening degree of an inlet guide vane, an intake air temperature, an output power, or a pressure in a compressor casing.

With the above configuration (18), it is possible to appropriately determine the target temperature of the disk cavity temperature, based on at least one of the vane opening degree of the inlet guide vane, the intake air temperature, the output power, or the pressure in the compressor casing.

(19) A disk cavity temperature control device according to at least one embodiment of the present invention is a device for controlling a disk cavity temperature which is a temperature of a disk cavity of a gas turbine by controlling a valve opening degree of a cooling-air adjustment valve for controlling supply of a cooling air for cooling the disk cavity, comprising: a target temperature determination unit configured to determine a target temperature of the disk cavity temperature, based on an object operating state which is an operating state of the gas turbine before control; a valve opening degree determination unit configured to determine the valve opening degree such that the disk cavity temperature after control is equal to or lower than the target temperature, based on the object operating state; and a command opening degree calculation unit configured to calculate a command opening degree to the cooling-air adjustment valve, based on a determined opening degree determined by the valve opening degree determination unit.

With the above configuration (19), the target temperature is determined based on the object operating state, and the valve opening degree of the cooling-air adjustment valve is controlled based on the object operating state such that the disk cavity temperature is equal to or lower than the determined target temperature. Thus, before the influence of the operating state which may change over time is reflected in the disk cavity temperature, it is possible to determine the target temperature according to the operating state, and determine the determined opening degree of the cooling-air adjustment valve according to the operating state, in a feedforward manner. As a result, the cooling air can be appropriately introduced into the disk cavity, and the disk cavity can be appropriately cooled while reliably preventing the case that the disk cavity temperature exceeds the temperature limit. Consequently, it is possible to improve the performance of the gas turbine.

(20) In some embodiments, in the above configuration (19), the target temperature is lower than a temperature limit of the disk cavity temperature, and the valve opening degree determination unit is configured to control the valve opening degree of the cooling-air adjustment valve so as to be a valve opening degree determined by the valve opening degree determination device described in any one of the above (1) to (10).

With the above configuration (20), the same effect is achieved as in the above (1) to (10).

Further, since the target temperature is set lower than the temperature limit of the disk cavity temperature, when the determined opening degree of the cooling-air adjustment valve is determined based on the prediction value of the disk cavity temperature, it is possible to reduce a possibility that the disk cavity temperature exceeds the temperature limit. Thus, it is possible to improve the reliability of the gas turbine.

(21) In some embodiments, in the above configuration (19) or (20), the target temperature determination unit is configured to determine a temperature determined by the disk cavity target temperature determination device described in any one of the above (11) to (18) as the target temperature.

With the above configuration (21), the same effect is achieved as in the above (11) to (18).

(22) A valve opening degree determination method for a cooling-air adjustment valve according to at least one embodiment of the present invention is a method for determining a valve opening degree of the cooling-air adjustment valve for controlling supply of a cooling air for cooling a disk cavity of a gas turbine, comprising: a step of acquiring an object operating state which is an operating state of the gas turbine before control; and a step of calculating the valve opening degree such that a disk cavity temperature which is a temperature of the disk cavity after control is equal to or lower than a target temperature, based on the object operating state. The step of calculating the valve opening degree includes determining an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and an input value of the valve opening degree. The prediction model is generated based on a plurality of previous data in which the operating state, the disk cavity temperature, and an actual opening degree of the cooling-air adjustment valve previously acquired are associated with each other.

With the above configuration (22), the same effect is achieved as in the above (1).

(23) In some embodiments, in the above configuration (22), the valve opening degree determination method further comprises: a step of determining an adjustment opening degree for adjusting the valve opening degree, based on a deviation between the target temperature and a measurement value of the disk cavity temperature.

With the above configuration (23), since the adjustment opening degree for finely controlling the valve opening degree of the cooling-air adjustment valve is determined while the measurement value of the disk cavity temperature is fed back, it is possible to more reliably match the measurement value of the disk cavity temperature with the target temperature.

(24) A disk cavity target temperature determination method according to at least one embodiment of the present invention is a method for determining a target temperature of a disk cavity temperature which is a temperature of a disk cavity of a gas turbine used for determining a valve opening degree of a cooling-air adjustment valve for controlling supply of a cooling air for cooling the disk cavity, comprising: a step of acquiring an object operating state which is an operating state of the gas turbine before control; and a step of calculating the target temperature, based on the object operating state. The step of calculating the target temperature includes determining an input value of the disk cavity temperature such that a loss-of-control probability of the gas turbine in the object operating state is equal to or lower than a predetermined probability as the target temperature, based on a classification model for obtaining the loss-of-control probability with an input value of the operating state and an input value of the disk cavity temperature. The classification model is generated based on a plurality of previous data in which controllability of the gas turbine is associated with the operating state and the disk cavity temperature previously acquired.

With the above configuration (24), the same effect is achieved as in the above (11).

(25) A disk cavity temperature control method according to at least one embodiment of the present invention is a method for controlling a disk cavity temperature which is a temperature of a disk cavity of a gas turbine by controlling a valve opening degree of a cooling-air adjustment valve for controlling supply of a cooling air for cooling the disk cavity, comprising: a step of determining a target temperature of the disk cavity temperature, based on an object operating state which is an operating state of the gas turbine before control; a step of determining the valve opening degree such that the disk cavity temperature after control is equal to or lower than the target temperature, based on the object operating state; and a step of calculating a command opening degree to the cooling-air adjustment valve, based on a determined opening degree determined by the step of determining the valve opening degree.

With the above configuration (25), the same effect is achieved as in the above (19).

(26) A valve opening degree determination program for a cooling-air adjustment valve according to at least one embodiment of the present invention is a program for determining a valve opening degree of the cooling-air adjustment valve for controlling supply of a cooling air for cooling a disk cavity of a gas turbine, causing a computer to execute: an object operating state acquisition function of acquiring an object operating state which is an operating state of the gas turbine before control; and a valve opening degree calculation function of calculating the valve opening degree such that a disk cavity temperature which is a temperature of the disk cavity after control is equal to or lower than a target temperature, based on the object operating state. The valve opening degree calculation function is configured to determine an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and an input value of the valve opening degree. The prediction model is generated based on a plurality of previous data in which the operating state, the disk cavity temperature, and an actual opening degree of the cooling-air adjustment valve previously acquired are associated with each other.

With the above configuration (26), the same effect is achieved as in the above (1).

(27) A disk cavity target temperature determination program according to at least one embodiment of the present invention is a program for determining a target temperature of a disk cavity temperature which is a temperature of a disk cavity of a gas turbine used for determining a valve opening degree of a cooling-air adjustment valve for controlling supply of a cooling air for cooling the disk cavity, causing a computer to execute: an object operating state acquisition function of acquiring an object operating state which is an operating state of the gas turbine before control; and a target temperature calculation function of calculating the target temperature, based on the object operating state. The target temperature calculation function is configured to determine an input value of the disk cavity temperature such that a loss-of-control probability of the gas turbine in the object operating state is equal to or lower than a predetermined probability as the target temperature, based on a classification model for obtaining the loss-of-control probability with an input value of the operating state and an input value of the disk cavity temperature. The classification model is generated based on a plurality of previous data in which controllability of the gas turbine is associated with the operating state and the disk cavity temperature previously acquired.

With the above configuration (27), the same effect is achieved as in the above (11).

(28) A disk cavity temperature control program according to at least one embodiment of the present invention is a program for controlling a disk cavity temperature which is a temperature of a disk cavity of a gas turbine by controlling a valve opening degree of a cooling-air adjustment valve for controlling supply of a cooling air for cooling the disk cavity, causing a computer to execute: a target temperature determination function of determining a target temperature of the disk cavity temperature, based on an object operating state which is an operating state of the gas turbine before control; a valve opening degree determination function of determining the valve opening degree such that the disk cavity temperature after control is equal to or lower than the target temperature, based on the object operating state; and a command opening degree calculation function of calculating a command opening degree to the cooling-air adjustment valve, based on a determined opening degree determined by the valve opening degree determination function.

With the above configuration (28), the same effect is achieved as in the above (19).

Advantageous Effects

At least one embodiment of the present invention provides a valve opening degree determination device for a cooling-air adjustment valve whereby it is possible to improve the performance of the gas turbine while appropriately cooling the disk cavity.

BRIEF DESCRIPTION OF DRAWINGS

FIG. 5C is a diagram showing (a) target temperature map and (b) opening degree map Fd according to an embodiment of the present invention.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
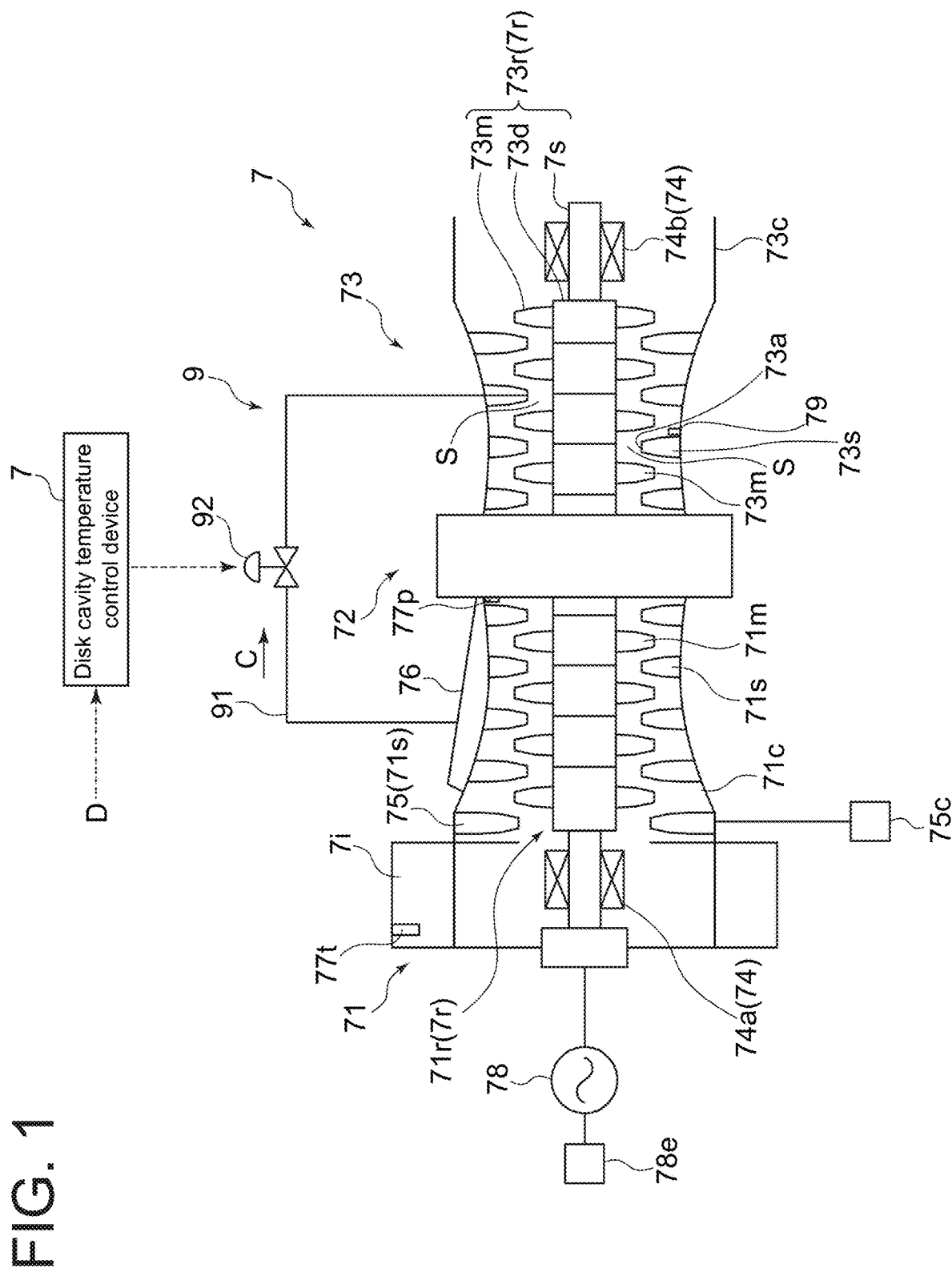
FIG. 1 is a schematic diagram of a gas turbine including a disk cavity temperature control device according to an embodiment of the present invention.

FIG. 1 is a schematic diagram of a gas turbine 7 including a disk cavity temperature control device 1 according to an embodiment of the present invention. As shown in FIG. 1, the gas turbine 7 includes a compressor 71, a combustor 72, and a turbine 73. The compressor 71 and the turbine 73 are connected by a rotor shaft 7s (rotational shaft) in the same straight line. The compressor 71 produces compressed air by compressing sucked-in air (intake air), and the combustor 72 combusts the compressed air by supplying fuel to produce a gas having high temperature and high pressure (hereinafter, referred to as "hot gas"). This hot gas rotationally drives the turbine 73. The rotational energy of the turbine 73 drives the generator 78, thus producing power. Further, a part of the rotational energy of the turbine 73 rotates the compressor 71.

More specifically, the compressor 71 includes an air inlet 7i and a compressor casing 71c (casing). On an inner wall of the compressor casing, 71c, stator vanes 71s are arranged (fixed) at intervals along the circumferential direction of the rotor shaft 7s (hereinafter, simply referred to as circumferential direction, as appropriate), and multiple stages of the stator vanes 71s are arranged along the axial direction of the rotor shaft 7s (flow direction of combustion gas; hereinafter, simply referred to as axial direction, as appropriate). Further, rotor blades 71m are arranged (fixed) at intervals along the circumferential direction of the rotor shaft 7s, and multiple stages of the rotor blades 71m are arranged along the axial direction. The compressor casing 71c accommodates the rotor blades 71m such that the stages of the stator vanes 71s and the rotor blades 71m circumferentially arranged are alternate therein. As a result, a flow passage is formed in the compressor casing 71c by a space between the inner wall of the compressor casing 71c and a compressor-side rotor portion 71r which is a portion including the rotor blades 71m and a part of the rotor shaft 7s rotatably supported to a bearing 74 (74a, 74b).

The air (intake air) sucked in the compressor 71 through the air inlet 7i flows through this flow passage along the axial direction toward the combustor 72 while the rotor 7r (rotating body) composed of the compressor-side rotor portion 71r and a turbine-side rotor portion 73r rotates, so that the compressed air having high temperature and high pressure is produced. Further, in the compressor casing 71c, an inlet guide vane 75 (IGV), which is one of the stator vanes 71s, is disposed upstream of the first stage of the rotor blades 71m. By controlling the opening degree thereof with an opening degree controller 75c, intake air amount can be adjusted.

Similarly, the turbine 73 has a turbine casing 73c (casing), in which stator vanes 73s are arranged at intervals along the circumferential direction of the rotor shaft 7s, and multiple stages of the stator vanes 73s are arranged along the axial direction. The turbine casing 73c accommodates rotor blades 73m such that the stages of the stator vanes 73s and the rotor blades 73m (turbine disks 73d) are alternate therein. As a result, a flow passage (hereinafter, gas flow passage) is formed in the turbine casing 73c by a space between the inner wall of the turbine casing 73c and a turbine-side rotor portion 73r which is a portion including the rotor blades 73m and a part of the rotor shaft 7s.

As the main flow of the hot gas produced by the combustor 72 flows through the gas flow passage toward an exhaust chamber and an exhaust casing (not shown) disposed on the downstream side in the flow direction of the hot gas in the turbine casing 73c, the rotor blades 73m of the turbine 73 are rotated.

Further, the gas turbine 7 includes a turbine cooling system 9, as shown in FIG. 1. The turbine cooling system 9 includes an extraction pipe 91 connected at one end to an extraction chamber 76 of the compressor 71 and at the other end to the turbine 73, and a cooling-air adjustment valve 92 disposed on the extraction pipe 91 for adjusting the flow rate or temperature (in FIG. 1, flow rate) of the compressed air flowing from the compressor 71 to the turbine 73. The compressed air bled from the compressor 71 has a temperature lower than the combustion gas, and the bled compressed air is supplied to the turbine 73 as cooling air C so as to pass through the stator vanes 73s, blade ring (turbine diaphragm), and casing of the turbine 73 to cool the parts in the passage area. Further, the cooling air C supplied by the turbine cooling system 9 is also used as film air and sealing air which may be discharged to the gas flow passage.

For instance, the turbine casing 73c has a space formed between the tip of a tip end portion 73a (inner diaphragm) of the stator vane 73s and the outer peripheral surface (turbine disk 73d and spacer not depicted) of the rotor (turbine-side rotor portion 73r) including the rotor shaft 7s, called a disk cavity S. The temperature of the disk cavity S needs to be kept below a temperature limit (e.g., 400° C. to 500° C.) to prevent damage to each portion. To this end, the cooling air C is supplied by the turbine cooling system 9.

More specifically, in the disk cavity S, a sealing member (e.g., labyrinth seal) is disposed between the outer peripheral portion (turbine disk 73d) of the rotor shaft 7s and the tip end portion 73a of the stator vane 73s to prevent the inflow of the hot gas through a space between adjacent stator vane 73s and rotor blade 73m. The cooling air C having a lower temperature than the hot gas is supplied from the tip end portion 73a of the stator vane 73s to cool the disk cavity S, and the supplied cooling air C is discharged from the sealing member to the gas flow passage to prevent the hot gas from flowing back to the disk cavity S, so that the disk cavity S is cooled.

In the embodiment shown in FIG. 1, an intake thermometer 77t is provided inside the air inlet 7i. The intake thermometer 77t measures the temperature (hereinafter, intake air temperature Ta) of the air (intake air) taken into the compressor casing 71c from the air inlet 7i. Similarly, a pressure gauge 77p provided inside the compressor casing 71c measures the pressure (compressor casing pressure) of the compressor 71. Further, the generator 78 is equipped with an electricity meter 78e. The electricity meter 78e enables measurement of electric power (generator output MW) generated by the generator 78. The temperature of the disk cavity S is measured by a thermometer 79 disposed on the turbine casing 73c. In addition, various measuring tools (sensors) may be provided in appropriate portions to monitor the operating state of gas turbine 7, such as an intake flow rate meter for measuring the flow rate of the intake air, or an intake pressure gauge for measuring the pressure of the intake air disposed inside the air inlet 7i although not depicted.

The use of the air bled from the compressor 71 causes the supply pressure of the cooling air C to change non-linearly depending on the operating state of the gas turbine 7. Accordingly, in the turbine 73, when pressure balance between the hot gas in the gas flow passage and the cooling air C supplied on the opposite side across the seal member changes so that the pressure of the hot gas is higher than the pressure of the cooling air C, the hot gas flows back to the disk cavity S. Further, when the hot gas flows into the disk cavity S, the temperature of the disk cavity S rapidly increases. Such pressure balance is also affected by aging change such as change of a gap of the seal member sealed by the cooling air C.

Therefore, in the gas turbine 7 according to the present embodiment, the valve opening degree of the cooling-air adjustment valve 92 is adjusted by the disk cavity temperature control device 1 described below to adjust supply of the cooling air C to the disk cavity S so that an actual measurement value Ts of the temperature of the disk cavity S (hereinafter, disk cavity temperature, DCT) is kept below a temperature limit.

Figure 2:
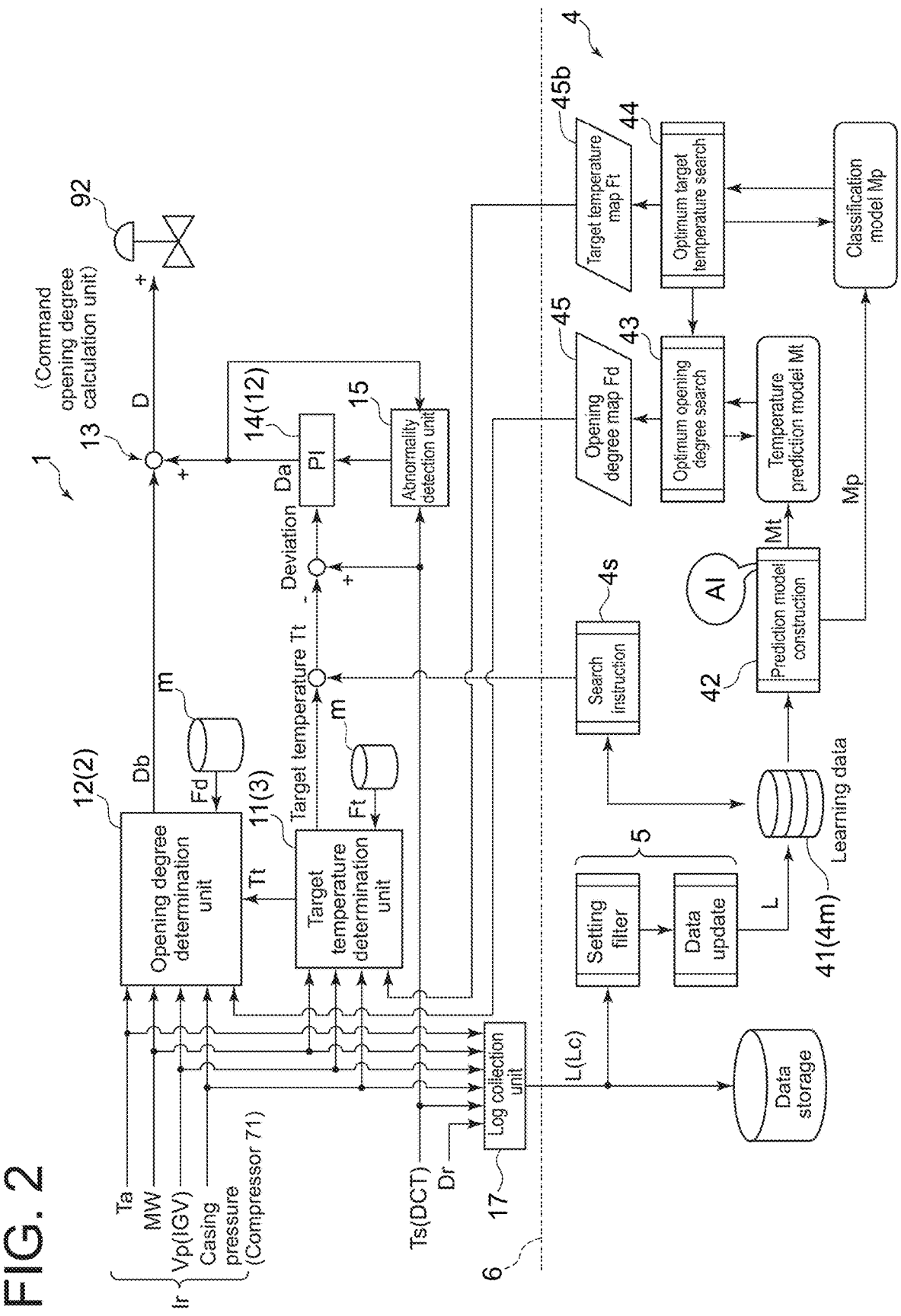
FIG. 2 is a block diagram showing a function of a disk cavity temperature control device according to an embodiment of the present invention, including a target temperature determination unit and a valve opening degree determination unit into which an object operating state is input.
Figure 3:
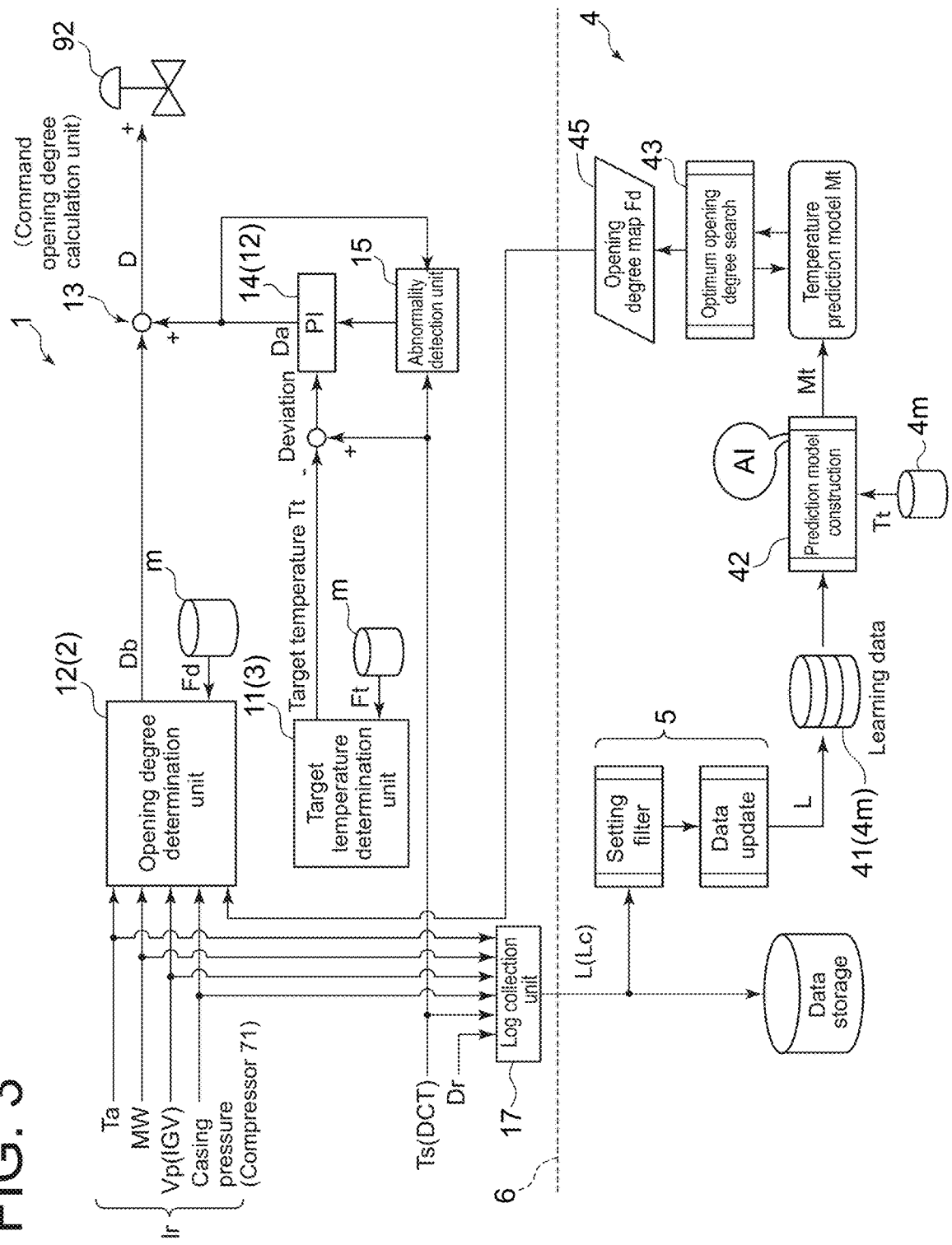
FIG. 3 is a block diagram showing a function of a disk cavity temperature control device according to an embodiment of the present invention, including a valve opening degree determination unit into which an object operating state is input.
Figure 4:
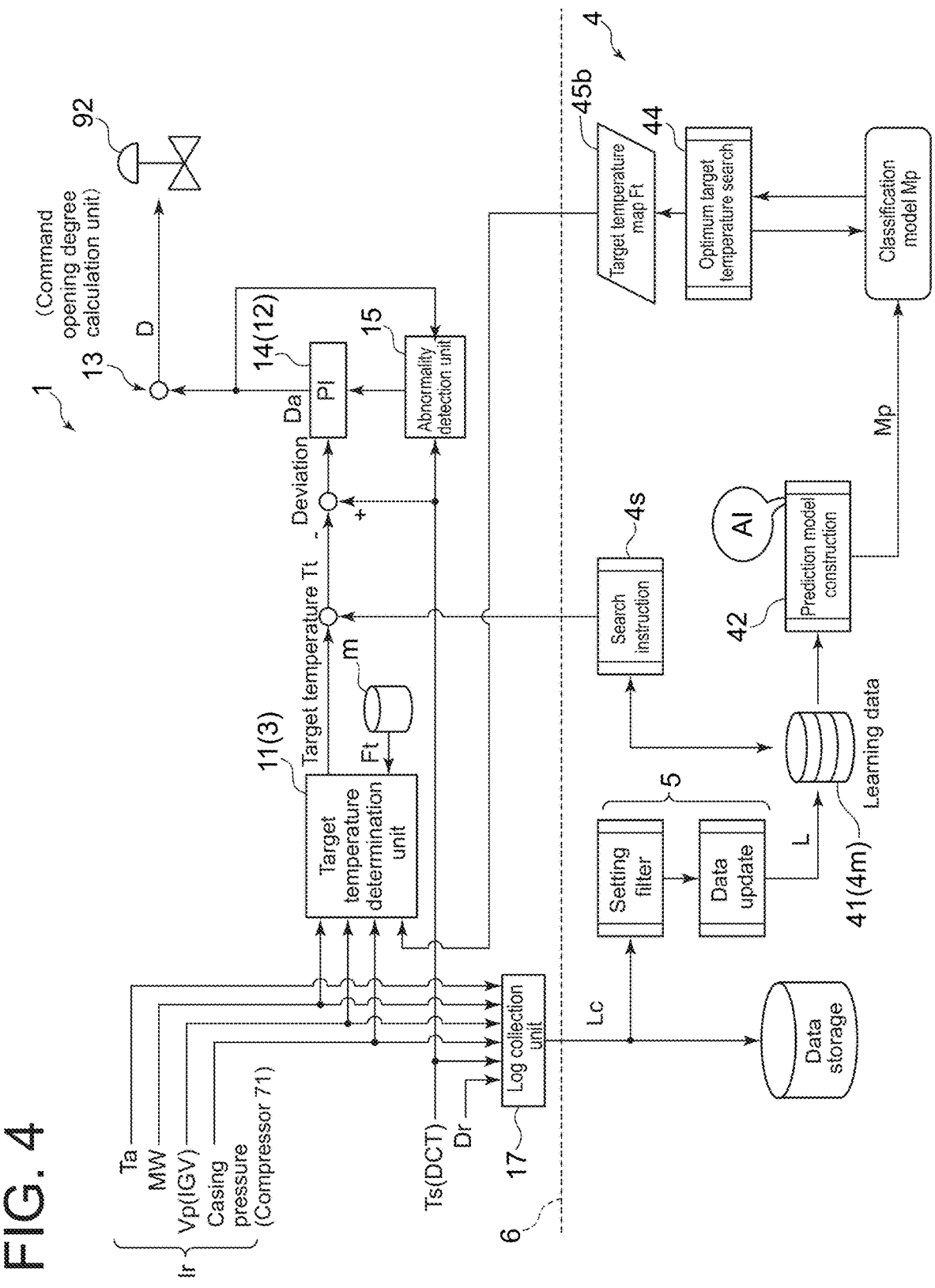
FIG. 4 is a block diagram showing a function of a disk cavity temperature control device according to an embodiment of the present invention, including a target temperature determination unit into which an object operating state is input.

The disk cavity temperature control device 1 will now be described in detail with reference to FIGS. 2 to 4. FIG. 2 is a block diagram showing a function of the disk cavity temperature control device 1 according to an embodiment of the present invention, including a target temperature determination unit 11 and a valve opening degree determination unit 12 into which an object operating state Ir is input. FIG. 3 is a block diagram showing a function of the disk cavity temperature control device 1 according to an embodiment of the present invention, including a valve opening degree determination unit 12 into which an object operating state Ir is input. FIG. 4 is a block diagram showing a function of the disk cavity temperature control device 1 according to an embodiment of the present invention, including a target temperature determination unit 11 into which an object operating state Ir is input.

The disk cavity temperature control device 1 is a device for controlling the disk cavity temperature by controlling the valve opening degree of the cooling-air adjustment valve 92 for controlling supply of the cooling air C for cooling the disk cavity S of the gas turbine 7. The disk cavity temperature control device 1 comprises a computer, for example, with a CPU (processor, not depicted) and a storage device m including a memory such as ROM and RAM. The CPU operates (e.g., computation of data) in accordance with program instructions (disk cavity temperature control program) loaded to a main storage device, and thereby the functional units are implemented. The disk cavity temperature control program may be stored in a computer-readable storage medium.

As shown in FIG. 2 (also FIGS. 3 and 4), the disk cavity temperature control device 1 includes a target temperature determination unit 11, a valve opening degree determination unit 12, and a command opening degree calculation unit 13.

These components of the disk cavity temperature control device 1 (hereinafter, simply, control device 1) will be described.

The target temperature determination unit 11 is a functional unit configured to determine a target temperature Tt of the disk cavity temperature (hereinafter, simply, target temperature Tt, as appropriate). In the embodiment shown in FIG. 2 (also FIG. 4 described later), the target temperature determination unit 11 is configured to determine the target temperature Tt, based on an object operating state Ir which is the operating state of the gas turbine 7 before control (at control). The operating state may include at least one of vane opening degree Vp of the inlet guide vane 75 (IGV), intake air temperature Ta, output power (MW), or compressor casing pressure (casing pressure) of the gas turbine 7. More specifically, the target temperature determination unit 11 may include a disk cavity target temperature determination device 3, which will be described later, and the target temperature Tt may be a temperature determined by the disk cavity target temperature determination device 3. A method for determining the target temperature Tt based on the object operating state Ir will be described later.

The valve opening degree determination unit 12 is a functional unit configured to determine the valve opening degree of the cooling-air adjustment valve 92 such that the controlled disk cavity temperature is equal to or lower than the target temperature Tt determined by the target temperature determination unit 11. In the embodiment shown in FIG. 2 (also FIG. 3 described later), the valve opening degree determination unit 12 is configured to determine the valve opening degree of the cooling-air adjustment valve 92 such that the disk cavity temperature after control is equal to or lower than the target temperature Tt, based on the object operating state Ir. More specifically, the valve opening degree determination unit 12 may include a valve opening degree determination device 2 for the cooling-air adjustment valve, which will be described later, to acquire a new valve opening degree determined by the valve opening degree determination device 2 (see FIGS. 2 and 3). A method for determining the valve opening degree based on the object operating state Ir will be described later.

Further, in the embodiment shown in FIG. 2 (also FIG. 4), the valve opening degree determination unit 12 includes a feedback control unit 14. In other words, the feedback control unit 14 forms a part of the valve opening degree determination unit 12. As shown in FIG. 2, the feedback control unit 14 is a functional unit configured to receive input of the target temperature Tt and the measurement value Ts of the disk cavity temperature (DCT in FIG. 2), and determine an adjustment opening degree Da for adjusting the valve opening degree (hereinafter, determined opening degree Db) of the cooling-air adjustment valve 92 determined by the valve opening degree determination unit 12 with feedback from the measurement value Ts of the disk cavity temperature such that a deviation between the target temperature Tt and the measurement value Ts of the disk cavity temperature is zero. However, the present invention is not limited to the present embodiment. In other embodiments, the valve opening degree determination unit 12 may not include the feedback control unit 14.

The command opening degree calculation unit 13 is a functional unit configured to calculate a command opening degree D to the cooling-air adjustment valve 92, based on the valve opening degree determined by the valve opening degree determination unit 12. In the embodiment shown in FIG. 2, the command opening degree calculation unit 13 is configured to calculate the command opening degree D transmitted to the cooling-air adjustment valve 92, based on the determined opening degree Db determined by the valve opening degree determination unit 12 based on the object operating state Ir and the adjustment opening degree Da determined by the feedback control unit 14 (PI) constituting a part of the valve opening degree determination unit 12 (for example, D=Db+Da).

In the embodiment shown in FIG. 2, various operating states acquired periodically are input to the target temperature determination unit 11 and the valve opening degree determination unit 12 as the object operating state Ir. More specifically, as the operating state, intake air temperature Ta, generator output MW, vane opening degree Vp of the inlet guide vane 75, and compressor casing pressure (casing pressure) are input. The intake air temperature Ta is a measurement value of the intake thermometer 77t, the generator output MW is a measurement value of the electricity meter 78e, the vane opening degree Vp of the inlet guide vane 75 is a control value of the opening degree controller 75c, and the compressor casing pressure (casing pressure) is a measurement value of the pressure gauge 77p. Alternatively, the vane opening degree Vp of the inlet guide vane 75 may be a measurement value. The generator output MW may be a command value. These operating states may be estimated values estimated by any method.

With the above configuration (FIG. 2), the target temperature Tt is determined based on the object operating state Ir, and the valve opening degree of the cooling-air adjustment valve 92 is controlled based on the object operating state Ir such that the disk cavity temperature (measurement value Ts) is equal to or lower than the determined target temperature Tt. Thus, before the influence of the operating state which may change over time is reflected in the disk cavity temperature, it is possible to determine the target temperature Tt according to the operating state, and determine the determined opening degree Db of the cooling-air adjustment valve 92 according to the operating state, in a feedforward manner. As a result, the cooling air C can be appropriately introduced into the disk cavity S, and the disk cavity S can be appropriately cooled while reliably preventing the case that the disk cavity temperature exceeds the temperature limit. Consequently, it is possible to improve the performance of the gas turbine 7.

However, the present invention is not limited to the above described embodiments.

In some embodiments, as shown in FIG. 3, the target temperature determination unit 11 may determine a temperature previously set by an operator of the gas turbine 7 as the target temperature Tt. In the embodiment shown in FIG. 3, the target temperature determination unit 11 is configured to acquire a temperature stored in the storage device m, and set the acquired temperature as the target temperature Tt. The storage device m may store a temperature limit of the disk cavity temperature, and the target temperature determination unit 11 may calculate a temperature lower than the temperature limit by subtracting a predetermined value from the temperature (e.g., temperature limit) stored in the storage device m or calculating a predetermined ratio of the temperature limit as the target temperature Tt. That is, the temperature control device 1 according to the embodiment shown in FIG. 3 differs from the embodiment shown in FIG. 2 in that the device does not include the target temperature determination unit 11 that performs calculation based on the object operating state Ir, so that only the determined opening degree Db can be determined in a feedforward manner.

In some embodiments, as shown in FIG. 4, the valve opening degree determination unit 12 may be the feedback control unit 14. More specifically, in the embodiment shown in FIG. 4, the valve opening degree determination unit 12 does not include a functional unit for calculation based on the object operating state Ir, and the command opening degree calculation unit 13 calculates the command opening degree D based on only the adjustment opening degree Da input from the feedback control unit 14, for instance, such that the adjustment opening degree Da is equal to the command opening degree D (D=Db). Thus, only the target temperature Tt can be determined in a feedforward manner.

In addition, in the embodiments shown in FIGS. 2 to 4, the temperature control device 1 includes an abnormality detection unit 15 configured to detect an abnormality (DCT loss-of-control state) when the measurement value Ts of the controlled disk cavity temperature exceeds the temperature limit. If an abnormality is detected, the abnormality detection unit 15 may output an alarm (e.g., sound, screen display, lighting, etc.) for notifying the operator of the abnormality. In addition to or in place of the alarm, the abnormality detection unit 15 may perform control such that the valve opening degree of the cooling-air adjustment valve 92 becomes greater than a valve opening degree in the normal state other than the abnormal state.

More specifically, in the embodiments shown in FIGS. 2 to 4, the abnormality detection unit 15 receives input of the measurement value Ts of the disk cavity temperature, the temperature limit, and the adjustment opening degree Da output from the feedback control unit 14, and, for instance, if the measurement value Ts of DCT exceeds the temperature limit, inputs a command to the feedback control unit 14 to increase the valve opening degree of the cooling-air adjustment valve 92 by a predetermined value in consideration of the preceding adjustment opening degree Da. In some embodiments, the measurement value Ts of the disk cavity temperature and the temperature limit may be input to the abnormality detection unit 15, and the command may be transmitted based on comparison of them.

Figure 5A:
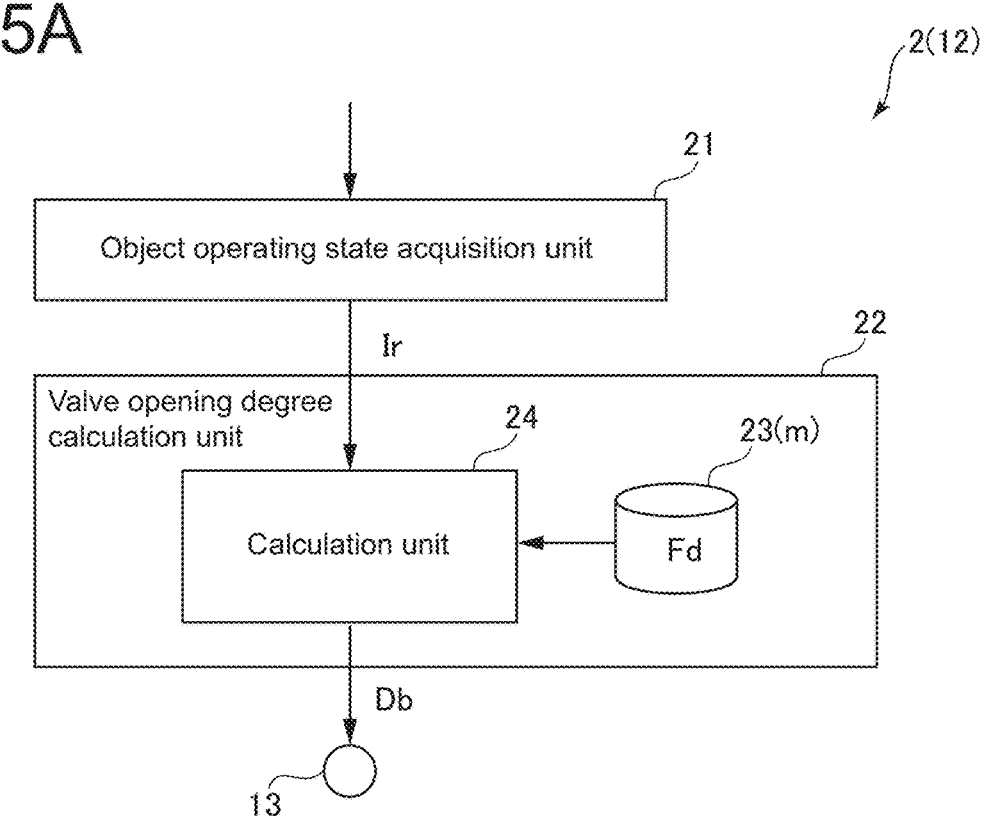
FIG. 5A is a block diagram of a valve opening degree determination device for a cooling-air adjustment valve according to an embodiment of the present invention.
Figure 5B:
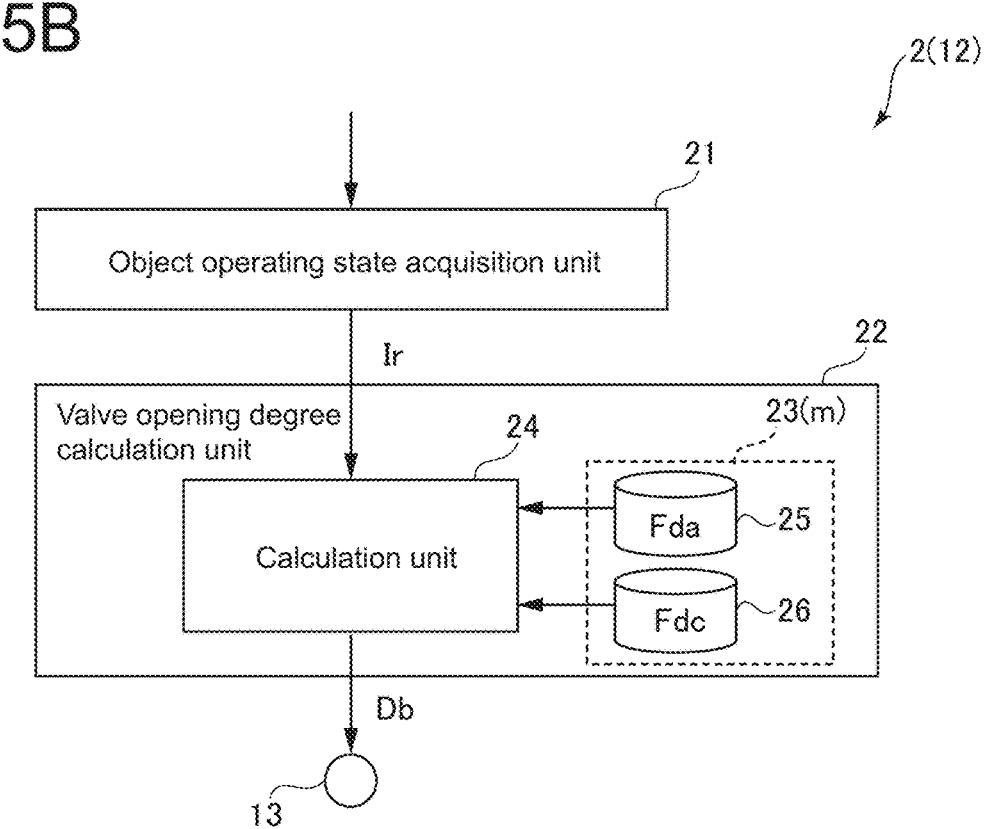
FIG. 5B is a block diagram of a valve opening degree determination device for a cooling-air adjustment valve according to an embodiment of the present invention, including an opening degree map retention unit having a first opening degree map retention unit and an opening degree correction map retention unit.
Figure 6:
FIG. 6 is a diagram for describing the learning process of a prediction model according to an embodiment of the present invention.

Next, embodiments for determining the valve opening degree of the cooling-air adjustment valve 92 based on the object operating state Ir will be described with reference to FIGS. 5A to 6. FIG. 5A is a block diagram of the valve opening degree determination device 2 for the cooling-air adjustment valve according to an embodiment of the present invention. FIG. 5B is a block diagram of the valve opening degree determination device 2 for the cooling-air adjustment valve according to an embodiment of the present invention, including an opening degree map retention unit 23 having a first opening degree map retention unit 25 and an opening degree correction map retention unit 26. FIG. 5C is a diagram showing (a) target temperature map Ft and (b) opening degree map Fd according to an embodiment of the present invention. FIG. 6 is a diagram for describing the learning process of a prediction model Mt according to an embodiment of the present invention.

In some embodiments, the valve opening degree determination unit 12 of the temperature control device 1 includes the valve opening degree determination device 2 for the cooling-air adjustment valve (hereinafter, simply, valve opening degree determination device 2) described below. The valve opening degree determination device 2 is a device for determining the valve opening degree (determined opening degree Db) of the cooling-air adjustment valve 92 for controlling supply of the cooling air C for cooling the disk cavity S of the gas turbine 7, and is configured to determine the determined opening degree Db such that the disk cavity temperature is equal to or lower than the target temperature Tt, according to the object operating state Ir. The valve opening degree determination device 2 may be implemented on physically the same device (housing) as the temperature control device 1, and may operate as a valve opening degree determination program on a computer that implements the temperature control device 1. In this case, the valve opening degree determination device 2 for the cooling-air adjustment valve is a part of functional units of the temperature control device 1. In some embodiments, the valve opening degree determination device 2 may be a device physically different from the temperature control device 1. The valve opening degree determination program may be stored in a computer-readable storage medium.

As shown in FIGS. 5A and 5B, the valve opening degree determination device 2 includes an object operating state acquisition unit 21 and a valve opening degree calculation unit 22. Each configuration of the valve opening degree determination device 2 will be described.

The object operating state acquisition unit 21 is a functional unit configured to acquire the object operating state Ir of the gas turbine 7. In the embodiment shown in FIGS. 5A and 5B, the object operating state acquisition unit 21 is connected to devices capable of acquiring various operating states in real time, such as the above-described measurement tools (77t, 77p, 78e, etc.) and control device (75c, etc.) so as to be able to acquire the latest values of the operating states, for example, periodically.

The valve opening degree calculation unit 22 is a functional unit configured to calculate the valve opening degree of the cooling-air adjustment valve 92 such that the disk cavity temperature after control is equal to or lower than the target temperature Tt, based on the object operating state Ir acquired by the object operating state acquisition unit 21. More specifically, the valve opening degree calculation unit 22 determines an input value of the valve opening degree of the cooling-air adjustment valve 92 such that the prediction value of the disk cavity temperature in the object operating state Ir is equal to or lower than the target temperature Tt as the valve opening degree (determined opening degree Db), based on a prediction model Mt for obtaining a prediction value of the disk cavity temperature with input values of the operating state and the valve opening degree of the cooling-air adjustment valve 92.

The prediction model Mt is generated based on a plurality of previous data L in which the operating state, disk cavity temperature, and actual opening degree Dr of the cooling-air adjustment valve 92 previously acquired at the same timing are associated with each other. In other words, each previous data L is a data set in which at least the operating state, disk cavity temperature, and actual opening degree Dr of the cooling-air adjustment valve 92 are measured or acquired at the same timing and stored as a single record, for example, indicating a relationship between them.

For instance, in some embodiments, the prediction model Mt may be generated by learning the previous data L. For instance, the prediction model Mt may be generated by applying a known machine learning method (algorithm) such as neural network. Alternatively, in some embodiments, multivariate analysis assuming polynomials, such as multiple regression analysis, may be applied to the plurality of previous data L. For example, in the multiple regression analysis, at least one operating state and valve opening degree of the cooling-air adjustment valve 92 are explanatory variables, and the disk cavity temperature is an objective variable.

Alternatively, in some embodiments, Bayesian linear regression, or Gaussian process regression may be applied to the plurality of previous data L to obtain the prediction model Mt as a probability distribution model (machine learning). In this case, the prediction value of the disk cavity temperature calculated by the prediction model Mt can be obtained stochastically rather than uniquely as in the model using the multivariate analysis. Further, since the prediction value of the disk cavity temperature can be expressed by probability, even if the number of previous data L for generating the prediction model Mt is small, it is possible to perform accurate prediction in consideration of uncertainty. With the prediction model Mt thus generated, the valve opening degree calculation unit 22 calculates the determined opening degree Db. The prediction model Mt is generated by a prediction model construction device 4 described below.

In the embodiments shown in FIGS. 2 and 3, the prediction model Mt is a Gaussian process regression model which is a probability distribution model for obtaining the prediction value of the disk cavity temperature based on the probability distribution. This probability distribution model is designed such that a probability that the prediction value based on the probability distribution is equal to or higher than the target temperature of the disk cavity temperature does not exceed a predetermined probability (for example, 20%). That is, the predicted temperature corresponding to a predetermined cumulative probability in the probability distribution does not exceed the target temperature of the disk cavity temperature. Thus, it is possible to appropriately obtain the prediction value of the disk cavity temperature.

The learning process of the prediction model Mt using the Gaussian process regression model will be described with reference to FIG. 6. Although the disk cavity temperature may change according to the operating state and the adjustment of the valve opening degree of the cooling-air adjustment valve 92 during operation of the gas turbine 7, for explanation, it is assumed that the operating state is constant, and the relationship between the cavity temperature and the valve opening degree is represented by {a %, T° C.}. In addition, the target temperature Tt in the description shall be updated each time the previous data L (learning data) is added, according to the target temperature determination device 3 described later.

In (1) of FIG. 6, in a given operating state, there is no previous data (learning data) at the start of learning, and the prediction model Mt is set to predict the disk cavity temperature by a probability distribution according to the normal distribution along the vertical axis with an initial temperature target value T0 as the center (average) at any opening degree. In this graph, the lines of the temperature T0±β represent the ends of the standard deviation σ×2 centered on the average of the probability distribution, and the portion indicated by the alarm line (temperature limit) represents 80% probability, for example.

Then, in (2), first previous data is acquired. By learning this previous data L, in the prediction model Mt, the accuracy of the disk cavity temperature prediction value with respect to the valve opening degree of the first previous data is improved, and the variance of the probability distribution near the first previous data is reduced. Simultaneously, the target temperature Tt is updated from T0 to T1 according to the target temperature determination device 3 described later. With respect to the updated target temperature T1, a valve opening degree at which a probability that the prediction value is equal to or higher than the target temperature T1 is 2.5% or less (outside 2σ) is exploratively obtained using the prediction model Mt, so that a relationship of {α1, T1} is obtained (α1 is not necessarily the same point as the first previous data). At this time, in the present embodiment, the valve opening degree is provided with a margin am (for example, 10%) to reliably prevent the disk cavity temperature from exceeding the target temperature T1, predicting that the temperature is T1 when the opening degree is α1+αm. That is, since the supply of the cooling air C and the cooling capacity are increased with an increase in valve opening degree, the measurement value Ts of the disk cavity temperature can be further reduced by the margin. Thus, it is possible to obtain a safe prediction value with little probability that the temperature exceeds the target temperature T1.

Then, as shown in (3), second previous data is acquired. In the same way as described above, the prediction model Mt learns the second previous data, and simultaneously, the target temperature is updated from T1 to T2 by operation of the target temperature determination device 3. An opening degree α2 corresponding to the updated T2 is obtained from the prediction model Mt, and in the same way as described above, predicting that the temperature is T2 when the opening degree is α2+αm. Thus, α2+αm is set as a new valve opening degree value. Thereafter, the same processing is performed every time the previous data is acquired. In (4), two new previous data are added, and the target temperature T3 and the valve opening setting α3+αm are obtained.

With the above configuration, the relationship between the disk cavity temperature and the actual opening degree Dr of the cooling-air adjustment valve 92 in any operating state of the gas turbine 7 is accumulated, and the prediction model Mt for calculating the prediction value of the disk cavity temperature at a given valve opening degree of the cooling-air adjustment valve 92 in a given operating state is previously generated based on the accumulated previous data. Further, the valve opening degree of the cooling-air adjustment valve 92 such that the prediction value of the disk cavity temperature obtained from the prediction model Mt becomes the target temperature Tt is determined based on the operating state (object operating state Ir) at the time when new valve opening degree (determined opening degree Db) of the cooling-air adjustment valve 92 is determined. Thus, before the influence of the operating state which may change over time is reflected in the disk cavity temperature, it is possible to determine new opening degree of the cooling-air adjustment valve 92 according to the operating state in a feedforward manner. As a result, the cooling air C can be appropriately introduced into the disk cavity S, and the disk cavity S can be appropriately cooled while the performance of the gas turbine 7 is improved.

In some embodiments, the valve opening degree calculation unit 22 may calculate the determined opening degree Db according to the object operating state Ir, using an opening degree map Fd defining the valve opening degree of the cooling-air adjustment valve 92 that allows the prediction value of the disk cavity temperature to be equal to or lower than the target temperature Tt for each operating state, previously generated based on the prediction model Mt by the prediction model construction device 4 described later. That is, in some embodiments, as shown in FIG. 5A, the valve opening degree calculation unit 22 includes an opening degree map retention unit 23 retaining the opening degree map Fd, and a calculation unit 24 configured to calculate the valve opening degree of the cooling-air adjustment valve 92 based on the object operating state Ir and the opening degree map Fd.

The opening degree map Fd may be a function with the operating state as variable (Db=Fd(Ir)) for calculating the determined opening degree Db, or may be a table of the same dimension as the number of operating states. In the embodiment shown in FIG. 5A, the opening degree map retention unit 23 is implemented by the storage device m of the temperature control device 1. Further, the calculation unit 24 of the valve opening degree calculation unit 22 is connected to the object operating state acquisition unit 21 and the opening degree map retention unit 23, and is configured to determine an opening degree obtained from the object operating state Ir using the opening degree map Fd as the determined opening degree Db.

More specifically, the target temperature Tt of the disk cavity temperature may be determined for each combination of the vane opening degree Vp of the inlet guide vane 75 and the intake air temperature Ta which are the operating state, and then the valve opening degree of the cooling-air adjustment valve 92 corresponding to each of the determined target temperatures Tt may be determined using the prediction model Mt to generate the opening degree map Fd. In the embodiment shown in FIG. 5C, a table (a) defining the target temperature Tt corresponding to each combination (x×y) of x-number of the vane opening degrees Vp of the inlet guide vane 75 and y-number of the intake air temperatures Ta is first generated. Then, the determined opening degree Db of the cooling-air adjustment valve 92 such that the disk cavity temperature becomes the target temperature Tt corresponding to each combination in the table is calculated to generate a table (b) corresponding to the opening degree map Fd. The target temperature Tt of the disk cavity temperature for each operating state may be calculated using a classification model Mp described later, for example.

In the case where the opening degree map Fd is table format, and the combination of values of various operating states is not in the table, the temperature control device 1 (valve opening degree determination unit 12) may obtain the determined opening degree Db corresponding to the object operating state Ir by extrapolation with an appropriate method such as proportional distribution. In the present embodiment, the opening degree map Fd generated by the prediction model construction device 4, which will be described later, is stored in the opening degree map retention unit 23. A method for generating the opening degree map Fd will be described below.

With the above configuration, the valve opening degree of the cooling-air adjustment valve 92 according to expected operating states and target temperatures is previously calculated using the prediction model Mt to previously generate the opening degree map Fd for obtaining the determined opening degree Db of the cooling-air adjustment valve 92 from the object operating state Ir. With this opening degree map Fd, the determined opening degree Db of the cooling-air adjustment valve 92 according to the object operating state Ir and the target temperature Tt is determined. Thus, the determined opening degree Db of the cooling-air adjustment valve 92 according to the object operating state Ir and the target temperature Tt can be directly obtained from the opening degree map Fd, so that it is possible to determine the valve opening degree of the cooling-air adjustment valve 92 in a short time after the object operating state Ir is obtained. In other words, it is possible to determine whether the disk cavity temperature calculated from the valve opening degree of the cooling-air adjustment valve 92 and the object operating state Ir using the prediction model Mt is equal to or lower than the target temperature Tt directly from the suitable opening degree map Fd without unidirectionally searching the valve opening degree of the cooling-air adjustment valve 92 as variable, for instance.

Further, in the above-described embodiment, in some embodiments, as shown in FIG. 5B, the opening degree map retention unit 23 includes a first opening degree map retention unit 25 retaining a first opening degree map Fda which is the opening degree map Fd generated at a reference time, and an opening degree correction map retention unit 26 retaining an opening degree correction map Fdc indicating a difference between the first opening degree map Fda and a second opening degree map Fdb which is the opening degree map Fd generated after the reference time. The calculation unit 24 of the valve opening degree calculation unit 22 may calculate the valve opening degree (determined opening degree Db) of the cooling-air adjustment valve 92 based on the first opening degree map Fda and the opening degree correction map Fdc. The reference time means a time at which the first opening degree map Fda stored in the first opening degree map retention unit 25 is generated. The second opening degree map Fdb may be the opening degree map Fd generated just after the first opening degree map Fda, or may be the opening degree map Fd generated after the first opening degree map Fda and then one or more opening degree maps Fd are generated.

That is, the valve opening degree obtained by calculation (e.g., addition) of valve opening degrees corresponding to a given operating state calculated using the first opening degree map Fda and the opening degree correction map Fdc is equal to the valve opening degree corresponding to the same operating state calculated using the second opening degree map Fdb. Thus, in the present embodiment, the determined opening degree Db corresponding to a given operating state is not calculated based on the second opening degree map Fdb, but is determined based on the first opening degree map Fda and the opening degree correction map Fdc. In the present embodiment, the first opening degree map Fda and the opening degree correction map Fdc generated by the prediction model construction device 4, which will be described later, are stored in the opening degree map retention unit 23 (24, 25). When the prediction model Mt is updated (e.g., re-learning), only the opening degree correction map Fdc stored in the opening degree correction map retention unit 26 may be updated.

With the above configuration, the determined opening degree Db of the cooling-air adjustment valve 92 is determined using the first opening degree map Fda and the opening degree correction map Fdc equivalent to the second opening degree map Fdb. Thus, when a value (correction value) defined by the opening degree correction map Fdc is greater than expected, for instance, by re-learning the prediction model Mt, it is possible to easily initialize to the first opening degree map (at reference time) while maintaining the prediction accuracy of the prediction model Mt, so that the reliability of control of the gas turbine 7 based on the prediction can be maintained.

Further, for instance, when the second opening degree map Fdb is generated periodically, and a part of the first opening degree map Fda is different from the second opening degree map Fdb, the opening degree correction map Fdc may be generated for only the different part as appropriate. Thus, it is possible to appropriately improve the accuracy of calculation of the determined opening degree Db.

Figure 7A:
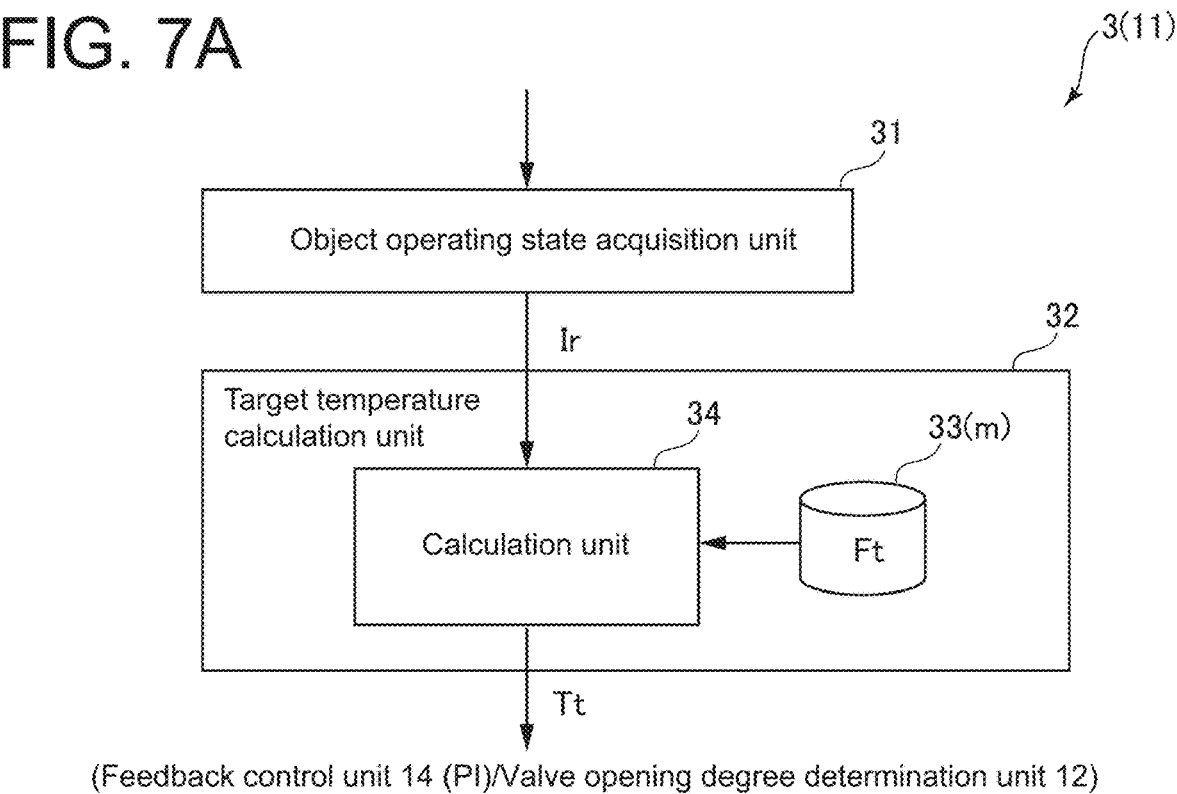
FIG. 7A is a block diagram showing a function of a disk cavity target temperature determination device according to an embodiment of the present invention.
Figure 7B:
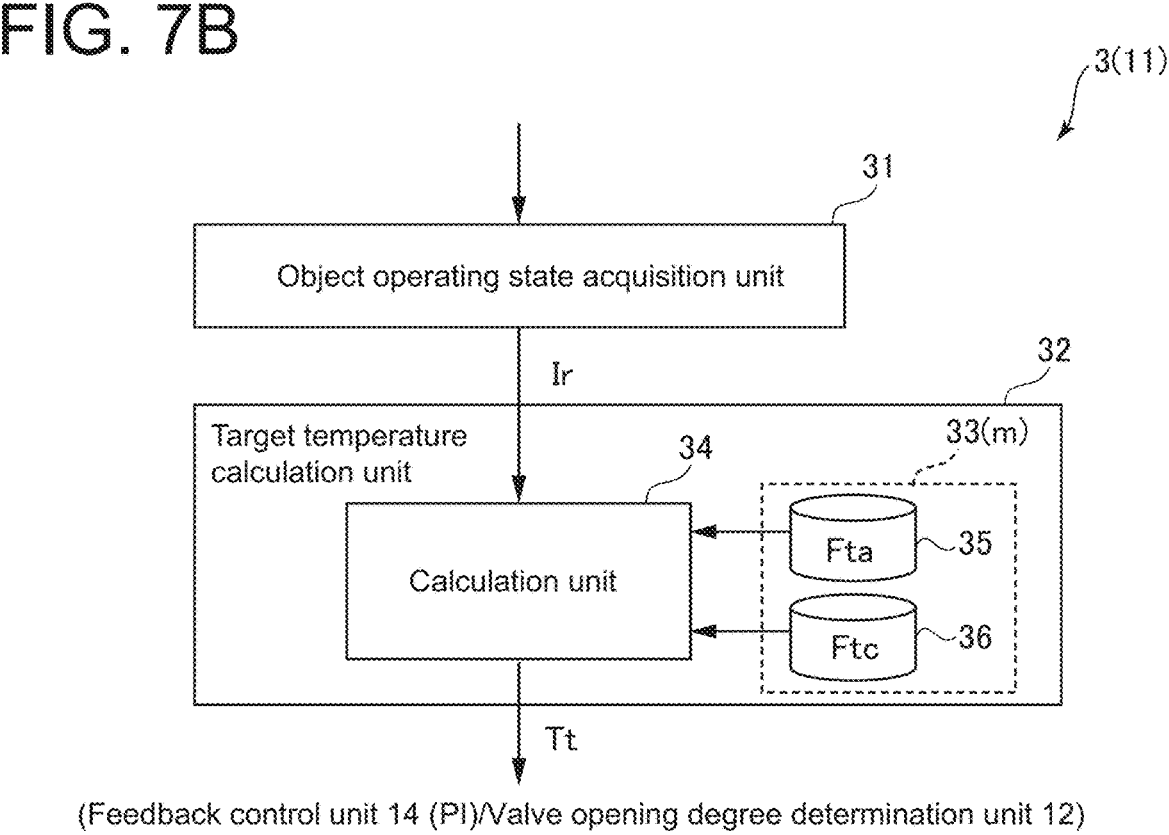
FIG. 7B is a block diagram showing a function of a disk cavity target temperature determination device according to an embodiment of the present invention, including a target temperature map retention unit having a first target temperature map retention unit and a target temperature correction map retention unit.
Figure 8:
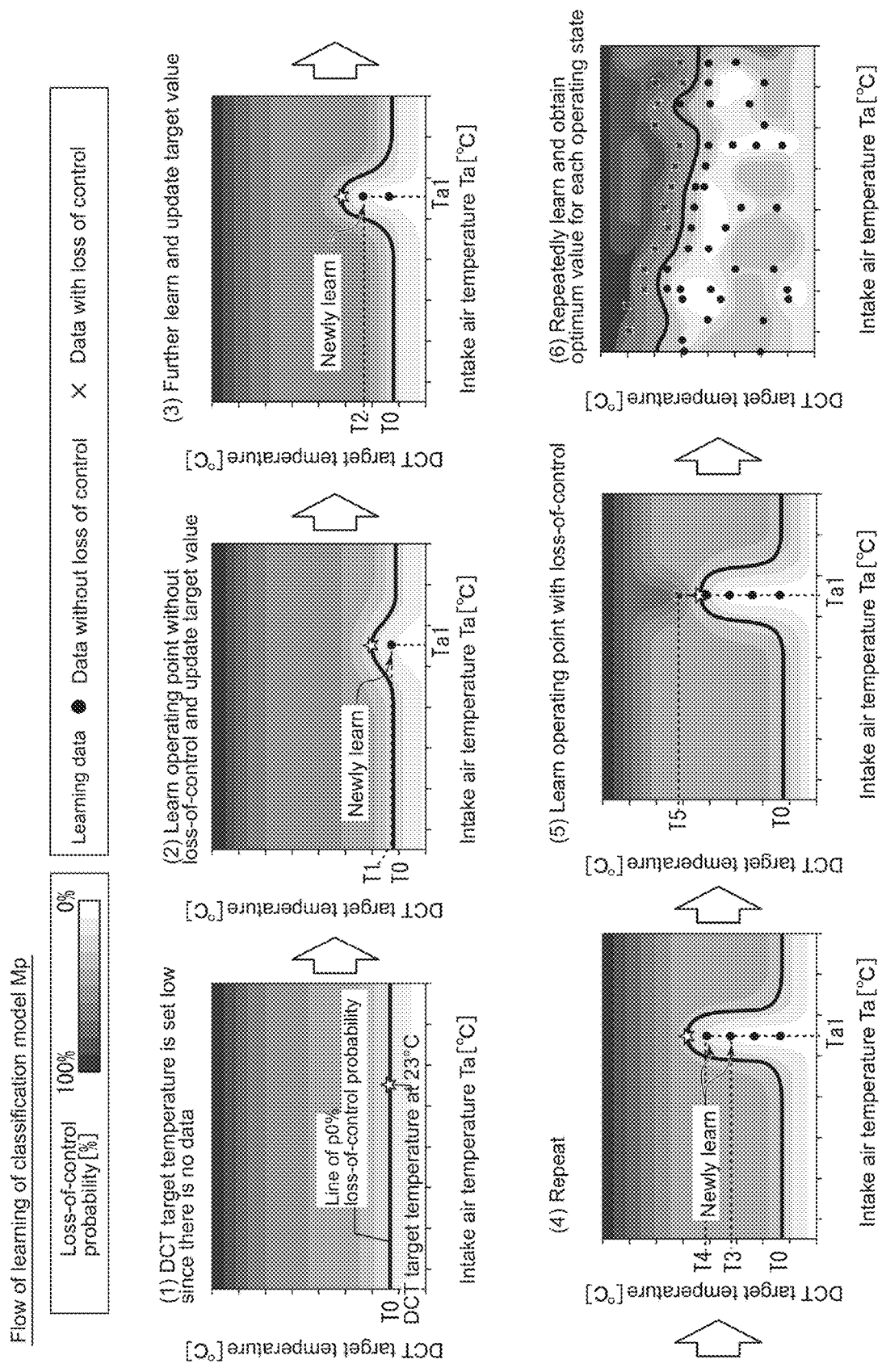
FIG. 8 is a diagram for describing the learning process of a classification model according to an embodiment of the present invention.

Next, embodiments for determining the target temperature Tt based on the object operating state Ir will be described with reference to FIGS. 7A to 8. FIG. 7A is a block diagram showing a function of the disk cavity target temperature determination device 3 according to an embodiment of the present invention. FIG. 7B is a block diagram showing a function of the disk cavity target temperature determination device 3 according to an embodiment of the present invention, including a target temperature map retention unit 33 having a first target temperature map retention unit 35 and a target temperature correction map retention unit 36. FIG. 8 is a diagram for describing the learning process of a classification model Mp according to an embodiment of the present invention.

In some embodiments, the valve opening degree determination unit 12 of the temperature control device 1 includes the disk cavity target temperature determination device 3 (hereinafter, simply, target temperature determination device 3). The target temperature determination device 3 is a device for determining the target temperature Tt of the disk cavity temperature, and is configured to determine the target temperature Tt according to the object operating state Ir. The target temperature Tt is used for determining the valve opening degree of the cooling-air adjustment valve for controlling supply of cooling air C for cooling the disk cavity S of the gas turbine 7. The target temperature determination device 3 may be implemented on physically the same device (housing) as the temperature control device 1, and may operate as a target temperature determination program on a computer that implements the temperature control device 1. In this case, the target temperature determination device 3 is a part of functional units of the temperature control device 1. In some embodiments, the target temperature determination device 3 may be a device physically different from the temperature control device 1. The target temperature determination program may be stored in a computer-readable storage medium.

As shown in FIG. 7A, the target temperature determination device 3 includes an object operating state acquisition unit 31 and a target temperature calculation unit 32. Each configuration of the target temperature determination device 3 will be described.

The object operating state acquisition unit 31 is a functional unit configured to acquire the object operating state Ir of the gas turbine 7. In the embodiment shown in FIGS. 7A and 7B, the object operating state acquisition unit 31 is connected to devices capable of acquiring various operating states in real time, such as the above-described measurement tools (77t, 77p, 78e, etc.) and control device (75c etc.) so as to be able to acquire the latest values of the operating states, for example, periodically.

The target temperature calculation unit 32 is a functional unit configured to calculate the target temperature Tt, based on the object operating state Ir acquired by the object operating state acquisition unit 31. More specifically, the target temperature calculation unit 32 determines an input value of the disk cavity temperature such that a loss-of-control probability of the gas turbine 7 in the object operating state Ir is equal to or lower than a predetermined probability as the target temperature Tt, based on a classification model Mp for obtaining the loss-of-control probability with input values of the operating state and the disk cavity temperature. The loss-of-control indicates a state where the disk cavity temperature exceeds the temperature limit even with control by the target temperature Tt of the disk cavity temperature, or a state where the disk cavity temperature is not settled to the target temperature Tt even with control of the valve opening degree of the cooling-air adjustment valve 92 such that the disk cavity temperature becomes the target temperature Tt (control hunting).

In the present embodiment, the classification model Mp is configured to determine a probability (excess probability) that the prediction value of the disk cavity temperature derived from input values of the operating state and the disk cavity temperature exceeds the temperature limit of the disk cavity. That is, the loss-of-control probability may include not only a probability (excess probability) that the prediction value of the disk cavity temperature output from the classification model Mp exceeds the temperature limit of the disk cavity temperature, but also a probability of occurrence of a state where the disk cavity temperature is not settled to the target temperature Tt even with control of the valve opening degree of the cooling-air adjustment valve 92 such that the disk cavity temperature becomes the target temperature Tt (control hunting). However, in the following description, the excess probability of the loss-of-control probability will be described as an example.

The classification model Mp is generated based on a plurality of previous data L in which the operating state and disk cavity temperature previously acquired at the same timing are associated with each other. As with the prediction model Mt described above, in some embodiments, the classification model Mp may be generated by learning the previous data L. Alternatively, in some embodiments, the k-nearest neighbor method or random forest may be applied to the plurality of previous data L. In some embodiments, the classification model Mp may be a probability distribution model. In the embodiment shown in FIGS. 2 and 4, the classification model Mp is a Gaussian process regression model. With the classification model Mp thus generated, the target temperature calculation unit 32 calculates the target temperature Tt. The prediction model Mt is generated by the prediction model construction device 4 described below.

The learning process of the classification model Mp using the Gaussian process regression model will be described with reference to FIG. 8. In FIG. 8, the vertical axis represents the target temperature Tt of the disk cavity temperature (DCT), and the horizontal axis represents the intake air temperature Ta as an example of the operating state for simplification of description. Further, as shown in (1), in the initial state before learning, a uniform distribution is previously set (assumed) in which the higher the disk cavity temperature, the higher the probability that control is lost at the target temperature Tt, regardless of the intake air temperature Ta. As the previous data L, a set of intake air temperature Ta, disk cavity temperature target value T, and controllability CLS (controllable: 1, uncontrollable: 0) is expressed by {Ta, T, CLS}.

In (1) of FIG. 8, there is no previous data L (learning data) at the start of learning, and as the initial value, with respect to a temperature T0 lower than the temperature limit of the disk cavity temperature which has been empirically obtained (for example, 350° C. when the ambient temperature of the gas turbine 7 is 25° C.), a probability that loss-of-control occurs is set to a predetermined probability p0 (e.g., 10%). Accordingly, in the target temperature determination device 3, the target temperature Tt such that the loss-of-control probability is equal to or lower than the predetermined probability p0 is always T0 at any intake air temperature Ta.

Then, in (2), first previous data L1 {Ta1, T1, 1} is acquired. At this time, it is determined that control is possible with the disk cavity temperature target value T1 at the intake air temperature Ta1, and the classification model Mp learns this data. As a result, the probability of loss-of-control is reduced near {Ta1, T1}, and the target temperature such that the loss-of-control probability is equal to or lower than the predetermined probability p0 is updated to a temperature slightly higher than T1.

Then, as shown in (3), second previous data L2 {Ta1, T2, 1} is acquired. By learning the second previous data L2, in the same way as described above, the probability of loss-of-control is reduced near {Ta1, T2}, the line of the probability p0 becomes higher than in (1), and this line is set as new target temperature Tt of the disk cavity temperature. Thereafter, learning is performed every time new previous data L is acquired. Specifically, (4) shows the case where third previous data L3 {Ta1, T4, 1} (T4>T3), and fourth previous data L3 {Ta1, T4, 1} (T4>T3) are learned.

Then, as shown in (5), fifth previous data L5 {Ta1, T5, 0} (T5>T4) is acquired, which indicates that the disk cavity temperature exceeds the temperature limit when the disk cavity temperature is T5. Since it can be determined that, at the intake air temperature Ta1, loss-of-control occurs when the target temperature of the disk cavity temperature is T5, the classification model Mp learns this data, so that the loss-of-control probability is increased near {Ta1, T5}, and the target temperature Tt of the disk cavity temperature such that the loss-of-control probability is equal to or lower than the predetermined probability p0 is set to a value lower than T5. By setting the target temperature Tt of the disk cavity temperature low, a risk of loss-of-control can be avoided.

Such process is repeated, and consequently, prediction of the loss-of-control by the classification model Mp is as shown in (6).

With the above configuration, the disk cavity temperature in any operating state of the gas turbine 7 is accumulated, and the classification model Mp for calculating the loss-of-control probability (in the above-described embodiment, excess probability) of the gas turbine 7 at a given disk cavity temperature in a given operating state is previously generated based on the accumulated data (previous data L). Further, given disk cavity temperature and operating state (object operating state) at the time of determining the target temperature Tt are input, and the disk cavity temperature such that the loss-of-control probability calculated by the classification model Mp is equal to or lower than the predetermined probability is determined as the target temperature Tt.

Thus, before the influence of the operating state which may change over time is reflected in the disk cavity temperature, it is possible to determine the target temperature Tt according to the operating state in a feedforward manner. Accordingly, for instance, by controlling the valve opening degree of the cooling-air adjustment valve 92 in a feedback manner such that the disk cavity temperature becomes the target temperature Tt adjusted according to the operating state (see FIGS. 2 and 4), it is possible to reliably prevent the occurrence of loss-of-control of the gas turbine 7.

In some embodiments, the target temperature calculation unit 32 may calculate the determined opening degree Db according to the object operating state Ir, using a target temperature map Ft defining the target temperature Tt that allows the excess probability to be equal to or lower than the predetermined probability for each operating state, previously generated based on the classification model Mp by the prediction model construction device 4 described later. That is, in some embodiments, as shown in FIG. 7A, the target temperature calculation unit 32 includes a target temperature map retention unit 33 retaining the target temperature map Ft, and a calculation unit 34 configured to calculate the target temperature Tt based on the object operating state Ir and the target temperature map Ft.

The classification model Mp may be a function with the operating state as variable (Tt=Ft(Ir)) for calculating the target temperature Tt, or may be a table of the same dimension as the number of operating states. In the embodiment shown in FIG. 7A, the target temperature map retention unit 33 is implemented by the storage device m of the temperature control device 1. Further, the calculation unit 34 is connected to the object operating state acquisition unit 31 and the target temperature map retention unit 33, and is configured to determine a temperature obtained from the object operating state Ir using the target temperature map Ft as the target temperature Tt.

In the case where the classification model Mp is table format, and the combination of values of various operating states is not in the table, the temperature control device 1 (target temperature determination unit 11) may obtain the target temperature Tt corresponding to the object operating state Ir by extrapolation with an appropriate method such as proportional distribution. In the present embodiment, the target temperature map Ft generated by the prediction model construction device 4, which will be described later, is stored in the target temperature map retention unit 33. A method for generating the target temperature map Ft will be described below.

With the above configuration, the target temperature Tt according to the object operating state Ir can be directly obtained from the target temperature map Ft, so that it is possible to determine the target temperature Tt in a short time after the object operating state Ir is obtained.

In the above-described embodiment, in some embodiments, as shown in FIG. 7B, the target temperature map retention unit 33 includes a first target temperature map retention unit 35 retaining a first target temperature map Fta which is the target temperature map Ft generated at a reference time, and a target temperature correction map retention unit 36 retaining a target temperature correction map Ftc indicating a difference between the first target temperature map Fta and a second target temperature map Ftb which is the target temperature map Ft generated after the reference time. The calculation unit 34 of the target temperature calculation unit 32 calculates the target temperature Tt based on the first target temperature map Fta and the target temperature correction map Ftc. The reference time means a time at which the first target temperature map Fta stored in the first target temperature map retention unit 35 is generated. The second target temperature map Ftb may be the target temperature map Ft generated just after the first target temperature map Fta, or may be the target temperature map Ft generated after the first target temperature map Fta and then one or more target temperature maps Ft are generated.

That is, the temperature obtained by calculation (e.g., addition) of temperatures corresponding to a given operating state calculated using the first target temperature map Fta and the target temperature correction map Ftc is equal to the temperature corresponding to the same operating state calculated using the second target temperature map Ftb. Thus, in the present embodiment, the target temperature Tt corresponding to a given operating state is not calculated based on the second target temperature map Ftb, but is determined based on the first target temperature map Fta and the target temperature correction map Ftc. In the present embodiment, the first target temperature map Fta and the target temperature correction map Ftc generated by the prediction model construction device 4, which will be described later, are stored in the target temperature map retention unit 33 (34, 35). When the classification model Mp is updated (e.g., re-learning), only the target temperature correction map Ftc stored in the target temperature correction map retention unit 36 may be updated.

With the above configuration, the target temperature Tt is determined using the first target temperature map Fta and the target temperature correction map Ftc equivalent to the second target temperature map Ftb. Thus, when a value (correction value) defined by the target temperature correction map Ftc is greater than expected, for instance, by re-learning the classification model Mp, it is possible to easily initialize to the first target temperature map Fta (at reference time) while maintaining the prediction accuracy of the target temperature map Ft, so that the reliability of control of the gas turbine 7 based on the prediction can be maintained.

Further, for instance, when the second target temperature map Ftb is generated periodically, and a part of the first target temperature map Fta is different from the second target temperature map Ftb, the target temperature correction map Ftc may be generated for only the different part as appropriate. Thus, it is possible to appropriately improve the accuracy of calculation of the target temperature Tt.

Figure 9:
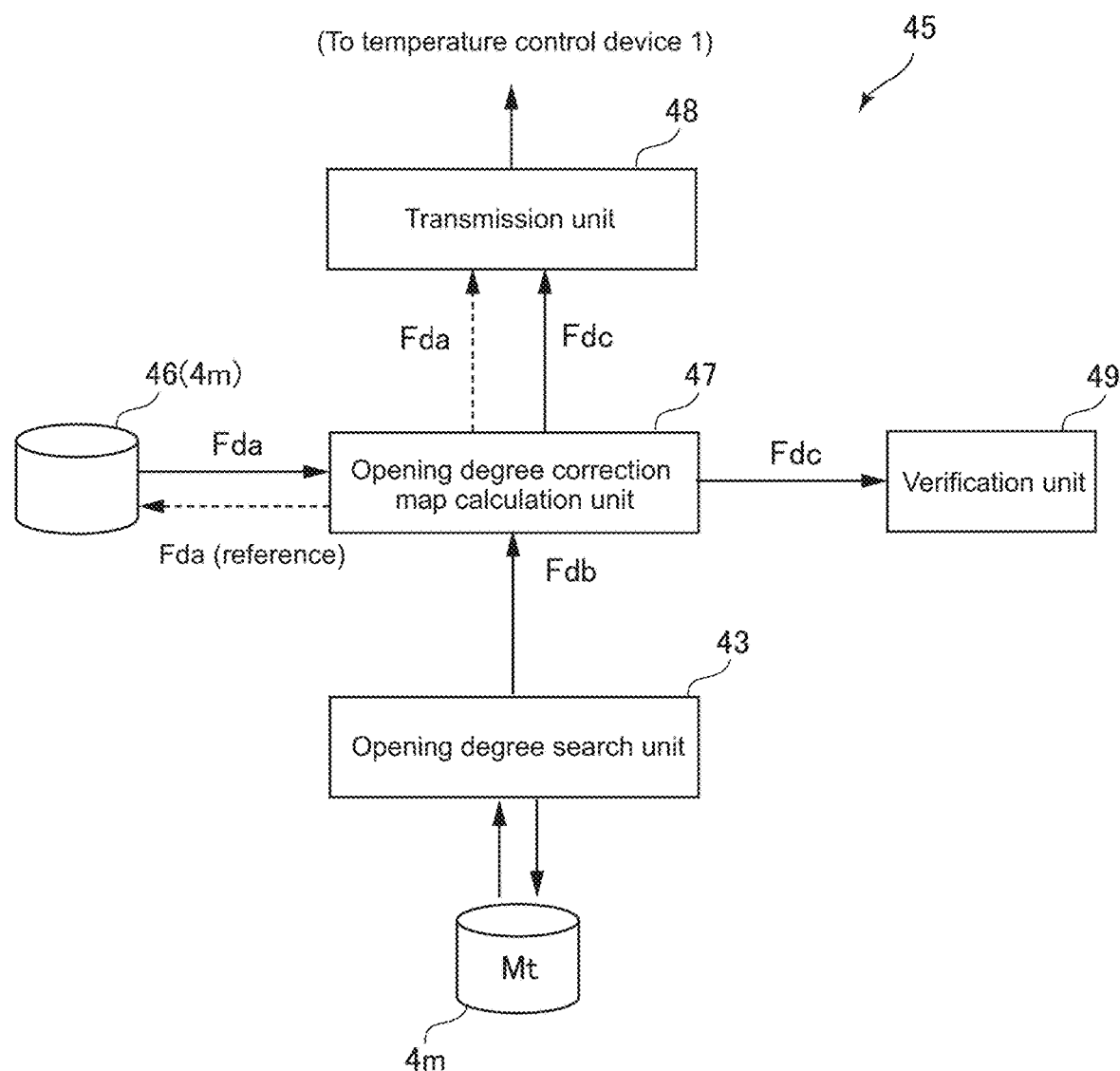
FIG. 9 is a block diagram showing a function of an opening degree map generation unit according to an embodiment of the present invention.
Figure 10:
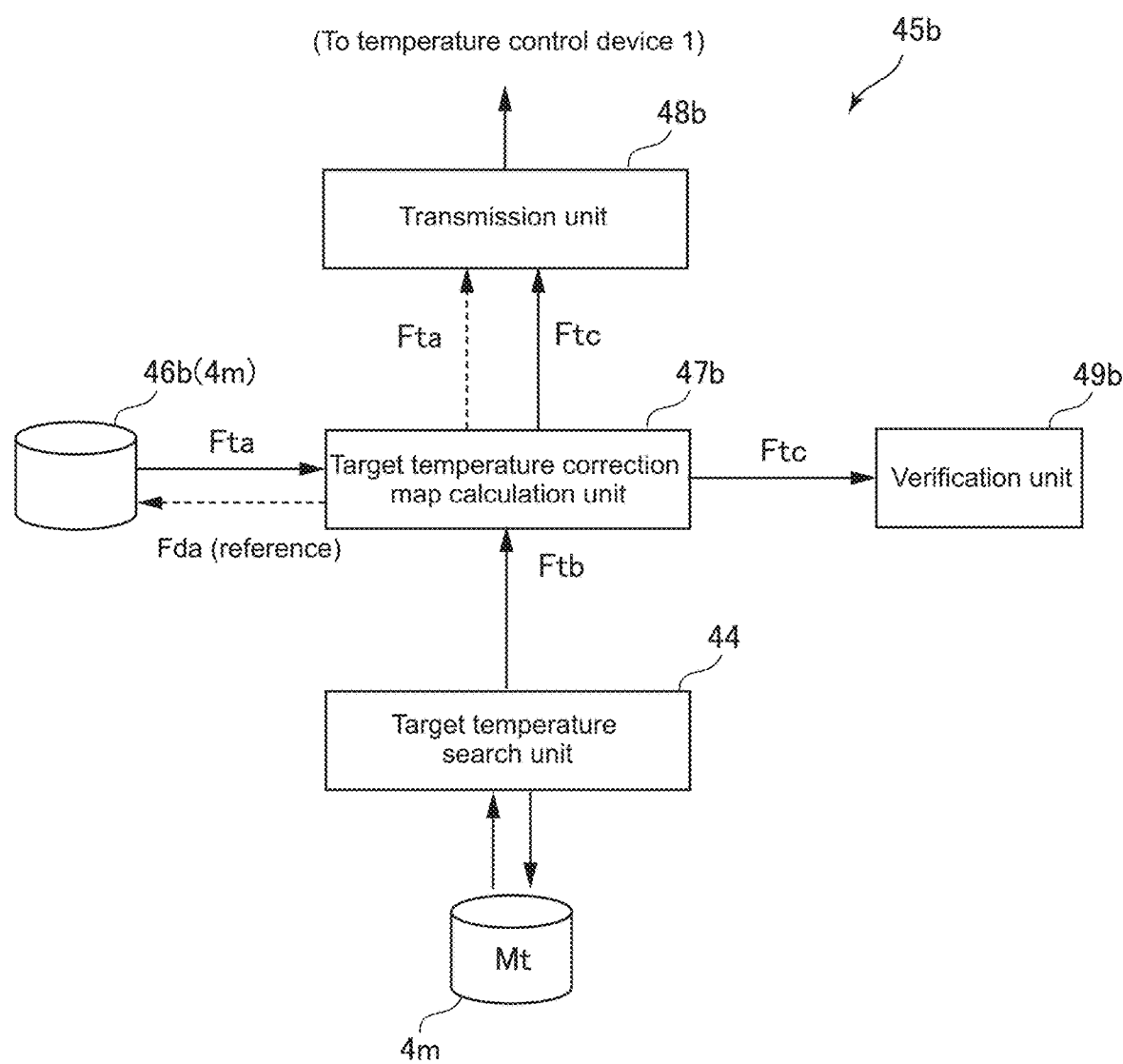
FIG. 10 is a block diagram showing a function of a target temperature map generation unit according to an embodiment of the present invention.
Figure 11:
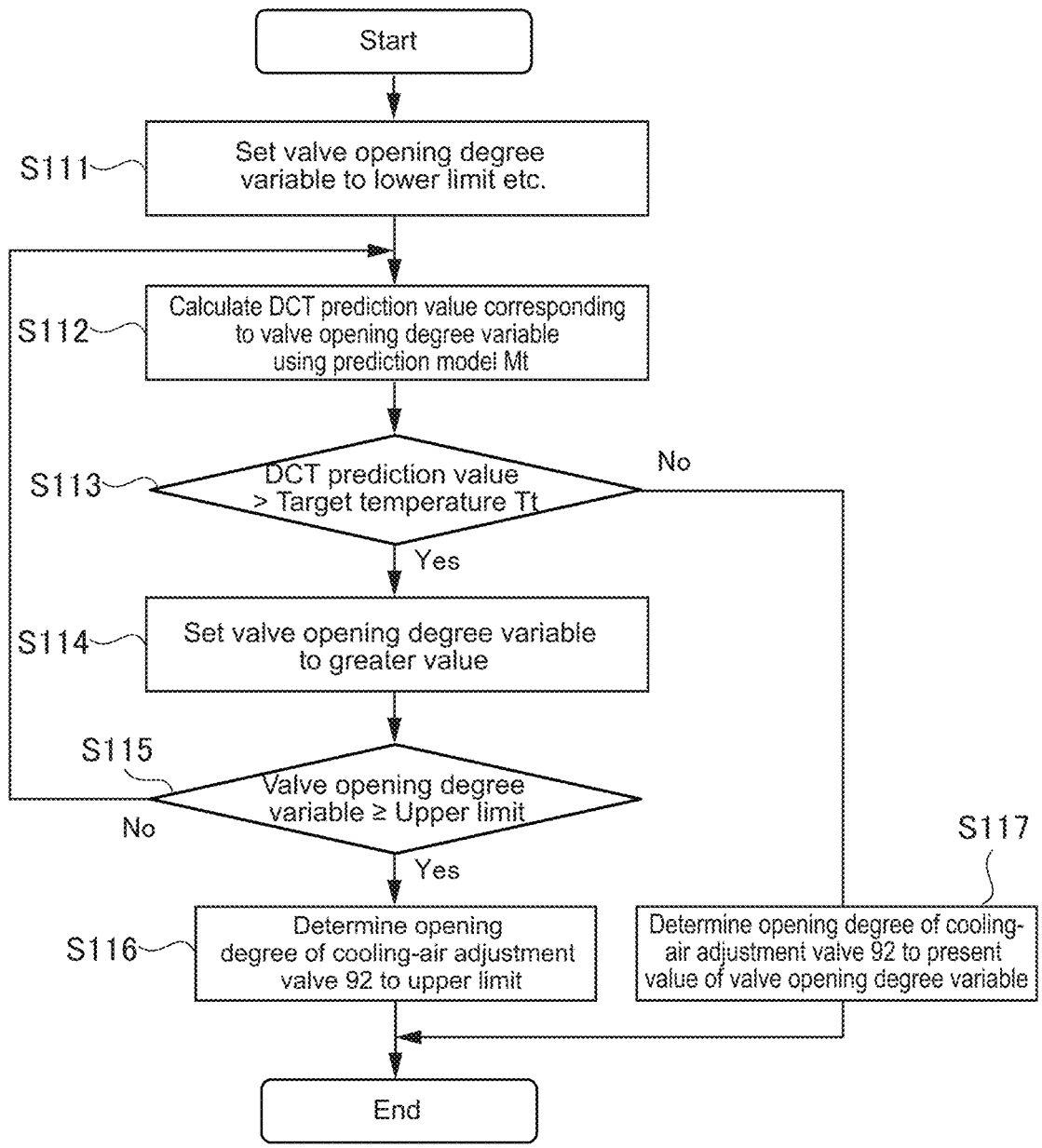
FIG. 11 is a flowchart of a method for determining the valve opening degree of a cooling-air adjustment valve according to an embodiment of the present invention.
Figure 12:
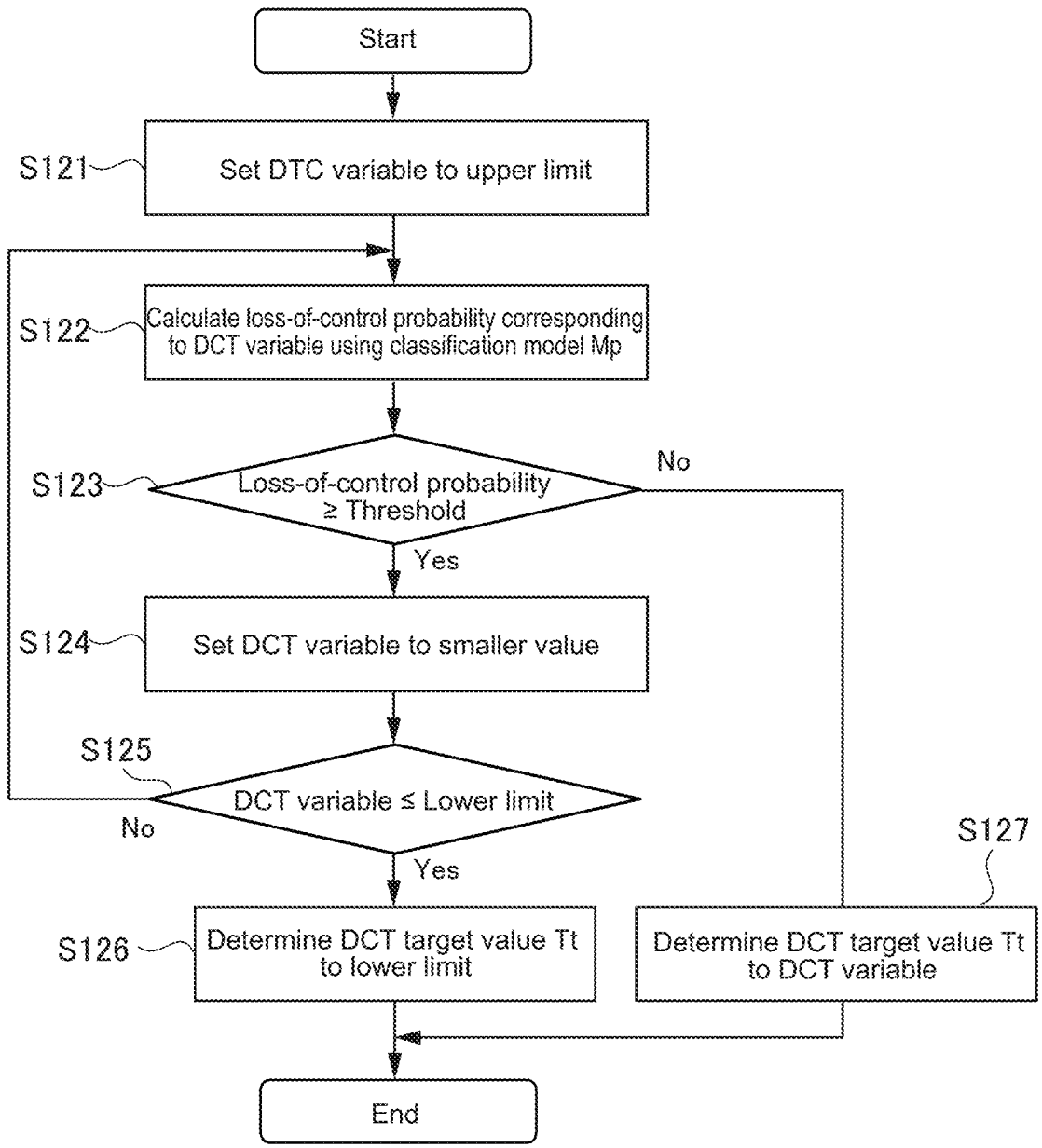
FIG. 12 is a flowchart of a method for determining the determined opening degree of a cooling-air adjustment valve according to an embodiment of the present invention.

The prediction model construction device 4 will now be described with reference to FIGS. 2 to 4 and 9 to 12. FIG. 9 is a block diagram showing a function of an opening degree correction map generation unit 45 according to an embodiment of the present invention. FIG. 10 is a block diagram showing a function of a target temperature correction map generation unit 45b according to an embodiment of the present invention. FIG. 11 is a flowchart of a method for determining the valve opening degree of the cooling-air adjustment valve 92 according to an embodiment of the present invention. FIG. 12 is a flowchart of a method for determining the determined opening degree Db of the cooling-air adjustment valve 92 according to an embodiment of the present invention.

The prediction model construction device 4 is a device for generating the prediction model M such as the prediction model Mt and the classification model Mp. The prediction model construction device 4 comprises a computer, for example, including a CPU (processor, not depicted) and a storage device 4m including a memory such as ROM and RAM. The CPU operates (e.g., computation of data) in accordance with program instructions (prediction model construction program) loaded to a main storage device, and thereby the functional units are implemented. The prediction model construction program may be stored in a computer-readable storage medium.

In some embodiments, as shown in FIGS. 2 to 4, 9, and 10, the prediction model construction device 4 includes a previous data storage unit 41 and a prediction model construction unit 42. Thereby, the prediction model M can be generated. Each functional unit will now be described.

The previous data storage unit 41 is a functional unit configured to store the above-described plurality of previous data L including the operating state obtained from the gas turbine 7 by measurement or the like. In the embodiments shown in FIGS. 2 to 4, the operating state during operation of the gas turbine 7, the measurement value of the disk cavity temperature (DCT), and the actual opening degree Dr of the cooling-air adjustment valve 92 are periodically acquired and transmitted to a log collection unit 17. Further, the log collection unit 17 transmits the collected data to the prediction model construction device 4 at a predetermined timing (for example, periodically). The previous data storage unit 41 stores the data transmitted from the log collection unit 17 as the previous data L.

The prediction model construction unit 42 is a functional unit configured to generate the prediction model M (Mt, Mp) based on the previous data L stored in the previous data storage unit 41. The prediction model M may be generated at a predetermined timing, or the prediction model M may be generated in response to an instruction from, for example, the operator, or may be generated periodically. The generated prediction model M is stored in the storage device 4m, for example.

More specifically, in some embodiments, as shown in FIGS. 2 to 4, 9, and 10, the prediction model construction device 4 may further include an opening degree search unit 43 (see FIGS. 2, 3, and 9) and a target temperature search unit 44 (see FIGS. 2, 4, and 10) configured to search an objective parameter which is the determined opening degree Db or the target temperature Tt using the prediction model M.

The opening degree search unit 43 is a functional unit configured to search the valve opening degree of the cooling-air adjustment valve 92 that allows the prediction value of the disk cavity temperature corresponding to the input value of the operating state, which can be obtained using the prediction model Mt, to be equal to or lower than the input value of the target temperature Tt similarly input. That is, with the prediction model Mt, it is possible to obtain the prediction value of the disk cavity temperature at any valve opening degree of the cooling-air adjustment valve 92 and any operating state. Thus, the opening degree search unit 43 uses the input values of the operating state and the valve opening degree of the cooling-air adjustment valve 92 as variables, and while varying values of the variables for instance in one direction, calculates the prediction value of the disk cavity temperature corresponding to the variables using the prediction model Mt, and compares the prediction value of the disk cavity temperature with the input value of the target temperature Tt each time. As a result of comparison, the input value of the valve opening degree of the cooling-air adjustment valve 92 at which the prediction value of the disk cavity temperature is equal to or lower than the input value of the target temperature Tt is determined as the determined opening degree Db.

As described above, the opening degree search unit 43 searches the input value (variable) of the valve opening degree of the cooling-air adjustment valve 92 that satisfies the above condition while varying the variable. At this time, to the valve opening degree of the cooling-air adjustment valve 92 obtained from the prediction model Mt, for example, a % of the valve opening degree (margin) may be added, and the resulting opening degree may be used as the determined opening degree Db. When the margin is provided, the supply of the cooling air C is increased by the margin, and the cooling capacity is improved. Thus, it is possible to set the determined opening degree Db to the opening degree that can reliably prevent the disk cavity temperature from exceeding the target temperature Tt during operation of the gas turbine 7.

In the embodiments shown in FIGS. 2, 3, and 9, the opening degree search unit 43 is configured to generate the opening degree map Fd by previously performing the searching of the determined opening degree Db as described above for each combination of the operating state and the opening degree of the cooling-air adjustment valve 92 to be expected and for each target temperature Tt to be expected. In the case where the input value of the operating state is fixed while the valve opening degree of the cooling-air adjustment valve 92 is varied to generate the opening degree map Fd, if the supply amount of the cooling air increase with an increase in valve opening degree, it is efficient to vary the valve opening degree from a prescribed lower or upper limit value in one direction for determining the objective valve opening degree.

For instance, when the input value of the opening degree is increased from the lower limit value, the prediction value of the disk cavity temperature becomes lower than the input value of the target temperature Tt at a certain valve opening degree. Similarly, when the input value of the opening degree is decreased from the upper limit value, the prediction value of the disk cavity temperature becomes higher than the input value of the target temperature Tt at a certain valve opening degree. In this way, by searching (finding) the boundary at which the magnitude relation between the prediction value of the disk cavity temperature and the target temperature Tt is reversed, it is possible to efficiently obtain the optimum valve opening degree that can minimize the flow rate of the cooling air C while cooling the disk cavity S below the target temperature Tt by the cooling air C.

Specifically, in the embodiment shown in FIG. 11, the valve opening degree of the cooling-air adjustment valve 92 in a given operating state is determined by sequentially increasing the input value (variable) of the valve opening degree. In FIG. 11, an upper limit value and a lower limit value of the input value of the valve opening degree are provided, and the valve opening degree is determined in this range. More specifically, in step S111 of FIG. 11, the input value of the valve opening degree of the cooling-air adjustment valve 92 (valve opening degree variable) is set to the initial value. In FIG. 11, the initial value is the lower limit value, but it may be any value between the lower limit value and the upper limit value. In step S112, the prediction value of the disk cavity temperature (DCT prediction value) corresponding to the valve opening degree variable is calculated using the prediction model Mt. In step S113, the calculated DCT prediction value and the target temperature Tt are compared. If the DCT prediction value is greater than the target temperature Tt (DCT prediction value>Tt), in step S114, the valve opening degree variable is set to a greater value.

Then, in step S115, it is determined whether the valve opening degree variable is greater than the upper limit value, and if the valve opening degree variable is smaller than the upper limit value (valve opening degree variable<upper limit value), the procedure returns to step S112, and the process is repeated using a new value of the valve opening degree variable set in step S114. Conversely, in step S115, if the valve opening degree variable is equal to or greater than the upper limit value (valve opening degree variable≥upper limit value), in step S116, the valve opening degree of the cooling-air adjustment valve 92 is determined to be the upper limit value, and the procedure ends. On the other hand, as a result of comparison in step S113, if the DCT prediction value is equal to or smaller than the target temperature Tt (DCT prediction value≤Tt), in step S117, the valve opening degree of the cooling-air adjustment valve 92 is determined to be the present value of the valve opening degree variable, and the procedure ends. In the above procedure, DCT prediction value>target temperature at the initial value, and the optimum valve opening degree is obtained by determining the valve opening degree variable when DCT prediction value≤target temperature Tt is first established.

Meanwhile, the target temperature search unit 44 is a functional unit configured to search the temperature (target temperature Tt) that allows the excess probability that the prediction value of the disk cavity temperature corresponding to the input value of the operating state and the input value of the disk cavity temperature, which can be obtained using the classification model Mp, exceeds the temperature limit of the disk cavity temperature similarly input to be equal to or lower than a predetermined probability (desired value, for example, 10%). Specifically, with the classification model Mp, the probability (excess probability) that the prediction value of the disk cavity temperature derived from input values of the operating state and the disk cavity temperature exceeds the temperature limit of the disk cavity temperature can be obtained. Thus, the target temperature search unit 44 uses the input values of the operating state and the disk cavity temperature as variables, and while varying values of the variables, calculates the excess probability corresponding to the variables using the classification model Mp, and compares the excess probability with the predetermined probability each time. As a result of comparison, the input value of the disk cavity temperature at which the excess probability is equal to or lower than the desired probability is determined as the objective target temperature Tt. Thus, the target temperature search unit 44 searches the input value (variable) of the disk cavity temperature that satisfies the above condition while varying the variable.

Specifically, in the embodiment shown in FIG. 12, the target temperature Tt in a given operating state is determined by sequentially decreasing the input value (variable) of disk cavity temperature. In FIG. 12, an upper limit value and a lower limit value of the input value of the disk cavity temperature are provided, and the target temperature Tt is determined in this range. More specifically, in step S121 of FIG. 12, the input value of the disk cavity temperature (DCT variable) is set to the initial value. In FIG. 12, the initial value is the upper limit value, but it may be any value between the lower limit value and the upper limit value. In step S122, the excess probability (loss-of-control probability) corresponding to the DCT variable is calculated using the classification model Mp. In step S123, the calculated excess probability (loss-of-control probability) and the predetermined probability (threshold) are compared. If the excess probability is equal to or greater than the threshold (excess probability≥threshold), in step S124, the DCT variable is set to a smaller value.

Then, in step S125, if the DCT variable is greater than the lower limit value (DCT variable>lower limit value), the procedure returns to step S122, and the process is repeated using a new value of the DCT variable set in step S124. Conversely, in step S125, if the input value of the disk cavity temperature is equal to or smaller than the lower limit value (DCT variable≤lower limit value), in step S126, the target temperature Tt is determined to be the lower limit value, and the procedure ends. On the other hand, as a result of comparison in step S123, if the excess probability is smaller than the threshold (excess probability<threshold), in step S127, the target temperature Tt is determined to be the present value of the DCT variable, and the procedure ends. In the above procedure, excess probability≥threshold at the initial value, and the optimum target temperature Tt is obtained by determining the DCT variable when excess probability<threshold is first established.

In the embodiments shown in FIGS. 2, 4, and 10, the target temperature search unit 44 is configured to generate the target temperature map Ft by previously performing the searching of the target temperature Tt as described above for each combination of the operating state and the disk cavity temperature to be expected. For the same reason as described in the opening degree map Fd, in the case where the input value of the operating state is fixed while the disk cavity temperature is varied to generate the target temperature map Ft, generally, since the excess probability increases with an increase in temperature, it is efficient to vary the temperature from the lower or upper limit value in one direction for determining the objective temperature.

The map F (opening degree map Fd, target temperature map Ft) generated by the prediction model construction device 4 having the above configuration is stored in the storage device m of the temperature control device 1. Thus, it is possible to accelerate the calculation of the determined opening degree Db according to the object operating state Ir by the valve opening degree determination unit 12 or the target temperature Tt according to the object operating state Ir by the target temperature determination unit 11. In the embodiment shown in FIGS. 2 to 4, the map F (Fd, Ft) generated by the prediction model construction device 4 is transmitted to the temperature control device 1 via a communication network 6. At this time, in the case where the map F is function format generated by multivariate analysis, only a coefficient of the polynomial may be transmitted to the temperature control device 1. In some embodiments, the map F may be stored in the storage device m of the temperature control device 1 via various portable computer-readable storage media (e.g., USB memory).

The communication network 6 (see FIGS. 2 to 4) may at least partially include wireless connection. Further, the communication network 6 may include a wide area network (WAN) such as the Internet, and may be communicably connected via a VPN formed on the WAN, for example. In this case, the prediction model construction device 4 corresponds to an embodiment installed outside a plant in which the temperature control device 1 is disposed, such as a remote monitoring center. Alternatively, the communication network 6 may include a local area network (LAN). In this case, the prediction model construction device 4 corresponds to an embodiment installed in a plant in which the temperature control device 1 is disposed.

Further, in some embodiments, as shown in FIGS. 9 and 10, the prediction model construction device 4 may further include a correction map generation unit (opening degree correction map generation unit 45, target temperature correction map generation unit 45b) configured to generate the correction map Fc such as the opening degree correction map Fdc and the target temperature correction map Ftc.

Specifically, as shown in FIG. 9, the opening degree correction map generation unit 45 includes a first opening degree map retention unit 46 retaining the first opening degree map Fda (described above) generated by the opening degree search unit 43, and an opening degree correction map calculation unit 47 for calculating the opening degree correction map Fdc (described above) after the second opening degree map Fdb (described above) is generated by the opening degree search unit 43. Further, in the embodiment shown in FIG. 9, the opening degree correction map Fdc generated by the opening degree correction map calculation unit 47 is transmitted from a transmission unit 48 included in the prediction model construction device 4 to the valve opening degree determination device 2 via the communication network 6, and is retained by the first opening degree map retention unit 25 of the valve opening degree determination device 2.

Similarly, as shown in FIG. 10, the target temperature correction map generation unit 45b includes a first target temperature map retention unit 46b retaining the first target temperature map Fta (described above) generated by the target temperature search unit 44, and a target temperature correction map calculation unit 47b for calculating the target temperature correction map Ftc (described above) after the second target temperature map Ftb (described above) is generated by the target temperature search unit 44. Further, in the embodiment shown in FIG. 10, the target temperature correction map Ftc generated by the target temperature correction map calculation unit 47b is transmitted from a transmission unit 48 included in the prediction model construction device 4 to the valve opening degree determination device 2 via the communication network 6, and is retained by the first target temperature map retention unit 35 of the valve opening degree determination device 2.

The generation of the first map Fa (Fda, Fta) at the reference time and the second map Fb (Fdb, Ftb) thereafter may be performed periodically, or by an instruction from the operator. The target temperature correction map Ftc may be automatically generated and transmitted in response to the generation of the second map Fb.

Further, in some embodiments, as shown in FIGS. 9 and 10, the prediction model construction device 4 may further include a verification unit 49 (49b) configured to check the validity of the opening degree correction map Fdc or the target temperature correction map Ftc which is the correction map Fc generated by the opening degree correction map calculation unit 47 or the target temperature correction map calculation unit 47b. The verification unit 49 (49b) is a functional unit configured to compare a value (correction value) defined by the correction map Fc with an expected value and determine whether the value is greater than the expected value. If the value (correction value) defined by the correction map Fc is greater than the expected value, the verification unit 49 (49b) may notify the prediction model construction unit 42 to cause the prediction model construction unit 42 to re-generate (re-learn) the prediction model M. Alternatively, the operator may be notified (message on a display, notification by sound or light, etc.). Further, they may be combined. Thus, it is possible to prevent execution of control by the temperature control device 1 using an inappropriate correction map Fc, and it is possible to improve the reliability of the temperature control device 1.

Figure 13:
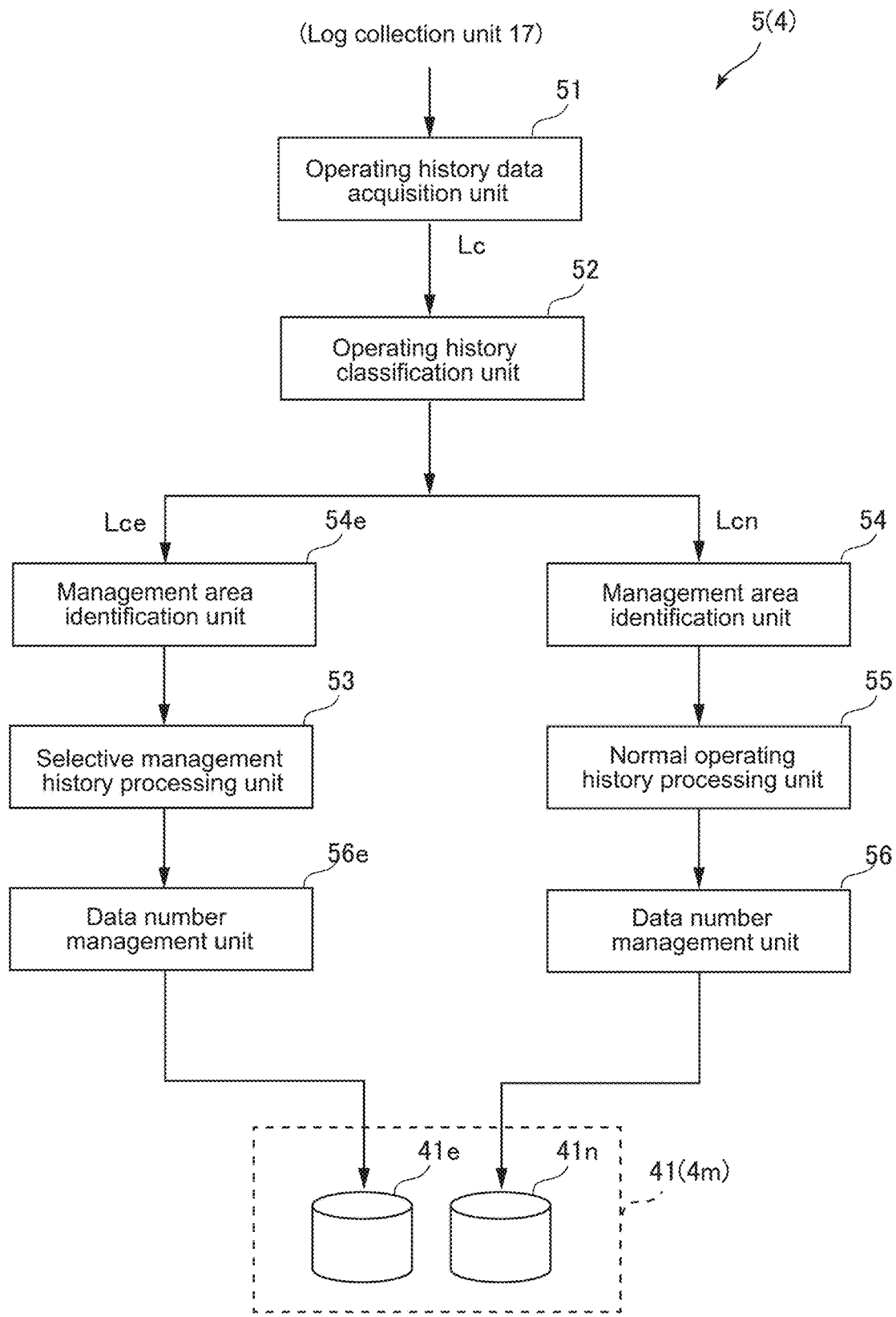
FIG. 13 is a block diagram showing a function of a previous data generation unit according to an embodiment of the present invention.

Next, the method for generating a plurality of previous data L used for generating the above-described various prediction models M will be described with reference to FIG. 13. FIG. 13 is a block diagram showing a function of a previous data generation unit 5 according to an embodiment of the present invention. In the following description, the prediction model M means the prediction model Mt or the classification model Mp, and the objective parameter means the determined opening degree Db or the target temperature Tt.

As described above, the optimum determined opening degree Db and target temperature Tt according to the operating state of the gas turbine 7 at any given time are affected by aging change of the gas turbine 7. Further, the overall prediction accuracy of the objective parameter of the prediction model M is improved as the diversity of the previous data L is increased. In the present embodiment, previous data L suitable for generating the prediction model M is selectively acquired.

To this end, in some embodiments, as shown in FIGS. 2 to 4 and 13, the prediction model construction device 4 further includes a previous data generation unit 5 configured to generate the plurality of previous data L used for generating the prediction model M, and a previous data storage unit 41 (described above) configured to store the previous data L generated by the previous data generation unit 5.

In some embodiments, as shown in FIG. 13, the previous data storage unit 41 includes a selective management history processing unit 41e configured to store selective management data Lce which is operating history data Lc as a candidate of the plurality of previous data L and has data of the disk cavity temperature exceeding the temperature limit of the disk cavity, and a normal management history storage unit 41n configured to store normal management data Lcn which is operating history data other than the selective management data Lce. In this way, since the selective management data Lce and the normal management data Lcn are separately stored, it is possible to perform flexible management according to the type of data, for example, management with different policies. Thus, effective improvement of the accuracy of the prediction model also enables generation of the previous data L.

Meanwhile, in some embodiments, as shown in FIG. 13, the previous data generation unit 5 includes an operating history data acquisition unit 51, a selective management history processing unit 53, a management area identification unit 54, and a data number management unit 56. Each functional unit will now be described.

The operating history data acquisition unit 51 is a functional unit configured to acquire the operating history data Lc which is a candidate of the plurality of previous data at a predetermined timing. The operating history data Lc is data transmitted from the log collection unit 17 to the prediction model construction device 4. In the case where the prediction model Mt is generated, the operating history data Lc includes at least data of the actual opening degree Dr of the cooling-air adjustment valve 92, disk cavity temperature, and operating state. In the case where the classification model Mp is generated, the operating history data Lc includes at least data of the controllability CLS (presence or absence of loss-of-control), disk cavity temperature, and operating state.

The selective management history processing unit 53 is a functional unit configured to record the selective management data Lce which is the operating history data Lc acquired by the operating history data acquisition unit 51 and having data of disk cavity temperature exceeding the temperature limit in the previous data storage unit 41 (selective management history processing unit 41e). Since the selective management data Lce is data in the case where the disk cavity temperature actually exceeds the temperature limit during operation of the gas turbine 7, the use of the selective management data Lce for generating the prediction model M improves the prediction accuracy of the prediction model M regarding the loss-of-control of DCT.

The management area identification unit 54 is a functional unit configured to identify a management area of the normal management history storage unit 41n in which the normal management data Lcn is to be stored (recorded), based on at least one data of the disk cavity temperature or the operating state included in the normal management data Lcn which is the operating history data Lc other than the selective management data Lce. More specifically, the management area (storage area) for storing the previous data L is defined for each combination of the value (range of value) of the disk cavity temperature and the value (range of value) of the operating state. The management area identification unit 54 checks, for each transmitted normal management data Lcn, the value of data constituting the normal management data Lcn, and identifies the management area in which the data is to be stored.

The normal management data Lcn may include the operating history data Lc relating to control hunting caused until the disk cavity temperature is settled to the target temperature Tt. The control hunting is a phenomenon in which the disk cavity temperature fluctuates around the target temperature Tt of the disk cavity temperature, and the disk cavity temperature is not settled around the target temperature Tt during feedback control due to coarse resolution of the valve opening degree. Specifically, the measurement value of the disk cavity temperature fluctuates within a range of the target temperature Tt±α. The operating history data Lc during such a phenomenon may be included in the selective management data Lce, but in the present embodiment, it is included in the normal management data since a risk of device damage due to control hunting is lower than when the disk cavity temperature exceeds the temperature limit.

The data number management unit 56 is a functional unit configured to manage the number of normal management data Lcn in each management area to a predetermined number or less from the latest data. Accordingly, for instance, when new normal management data Lcn is stored in each management area in which the number of stored normal management data Lcn is the predetermined number, the data number management unit 56 deletes the oldest data and stores the new normal management data Lcn.

In the embodiment shown in FIG. 13, the previous data generation unit 5 further includes an operating history classification unit 52 configured to determine whether the operating history data Lc acquired by the operating history data acquisition unit 51 is the selective management data Lce. The operating history classification unit 52 is connected to the operating history data acquisition unit 51 so that the operating history data Lc acquired by the operating history data acquisition unit 51 is input to the operating history classification unit 52. The operating history classification unit 52 transmits the operating history data Lc that is determined to be the selective management data Lce to the selective management history processing unit 53, and transmits the operating history data Lc that is determined to be the normal management data Lcn to the management area identification unit 54.

In the embodiments shown in FIGS. 2 to 4 and 13, the previous data generation unit 5 performs filtering (pre-processing) of the received operating history data Lc with a setting filter, and performs the above-described processing on the data that has passed through the setting filter. The settling filter has a role of selecting the operating history data Lc that is valid for generating the prediction model M. Specifically, the setting filter allows only the operating history data Lc acquired when the target temperature Tt settles and the feedback control settles to pass through. However, in some embodiments, the previous data L may not pass through the setting filter, and the previous data L not filtered by the setting filter may be stored in the storage device 4m. For instance, the learning data of the classification model Mp may be the previous data L stored in the previous data storage unit 41 without passing through (applying) the setting filter, and the probability that the control hunting occurs may be determined using the classification model Mp learned with such learning data.

As shown in FIG. 13, in some embodiments, the same processing as performed by the management area identification unit 54 and the data number management unit 56 may be applied to the selective management data Lce. In the embodiment shown in FIG. 13, the device includes a second management area identification unit 54e which is a functional unit configured to identify a management area of the selective management history processing unit 41e in which the selective management data Lce is to be stored (recorded), based on at least one data of the disk cavity temperature or the operating state included in the selective management data Lce, and a second data number management unit 56e which is a functional unit configured to manage the number of selective management data Lce in each management area to a predetermined number or less from the latest data. In the embodiment shown in FIG. 13, the identification of the management area and the management of the number of data are performed on both the selective management data Lce and the normal management data Lcn. However, they may be performed on at least one of the selective management data Lce or the normal management data Lcn.

With the above configuration, for instance, the selective management data Lce is stored unconditionally, and the normal management data Lcn is stored in each management area according to the contents thereof such that each management area stores a predetermined number or less of operating history data Lc from the latest one. As a result, since importance is placed on the selective management data Lce, the situation where the disk cavity temperature exceeds the temperature limit is reliably prevented, and the prediction model M is generated based on the latest operating history data Lc. Thus, it is possible to generate the prediction model M in consideration of aging change of the gas turbine 7. Further, since the number of operating history data Lc in each management area is limited, the influence of old data can be eliminated. Thus, it is possible to improve the prediction accuracy of the prediction model M. As described above, the same management as applied to the normal management data Lcn may be applied to the selective management data Lce. Since the number of normal management data Lcn is greater than the number of selective management data Lce, it is particularly effective to manage the normal management data Lcn.

In some embodiments, the previous data generation unit 5 may further include a normal operating history processing unit 55 configured to, if the normal management data Lcn whose management area is identified by the management area identification unit 54 satisfies a predetermined data addition condition, record the normal management data Lcn in the previous data storage unit 41. The data addition condition may include that the management area storing first normal management data Lcna is different from the management area of second operating history data acquired by the operating history data acquisition unit 51 within a predetermined time or n-th (n is an integer) acquisition after the first normal management data is acquired.

That is, when series of operating history data Lc acquired by the operating history data acquisition unit 51 are data to be stored in the same management area, the data addition condition prevents two continuous data from being stored together. Such operating history data Lc has little influence on the accuracy of the prediction model M even when both are stored as the previous data L. Accordingly, by storing either one in the management area, it is possible to maintain the diversity of the plurality of previous data L and improve the prediction accuracy of the prediction model M.

Further, if the selective management data Lce is acquired between the first normal management data Lcna and the second normal management data Lcnb, the second normal management data Lcnb may be stored. That is, the normal operating history processing unit 55 may be configured to process such a situation as an exception to the data addition condition.

With the above configuration, for the normal management data Lcn, the normal management data Lcn satisfying the predetermined data addition condition is stored, and selection is made such that data is not continuously stored in the same management area, for instance. Accordingly, it is possible to improve the diversity of the operating history data Lc stored in the same management area, and it is possible to improve the prediction accuracy of the prediction model M.

Additionally, as shown in FIGS. 2 and 4, the prediction model construction device 4 may include a target temperature instruction unit 4s capable of instructing a desired target temperature Tt. With this configuration, since the operating history data Lc corresponding to the instructed target temperature Tt can be generated, by intentionally setting the target temperature Tt to a high value and acquiring the operating state under the same setting, learning speed can be increased. In this way, it is possible to maintain the diversity of the previous data L used for generation of the prediction model M.

Hereinafter, the disk cavity temperature control method (FIG. 14), the valve opening degree determination method for the cooling-air adjustment valve (FIG. 15), and the disk cavity target temperature determination method (FIG. 16) corresponding to the processes executed by the above-described devices will be described.

Figure 14:
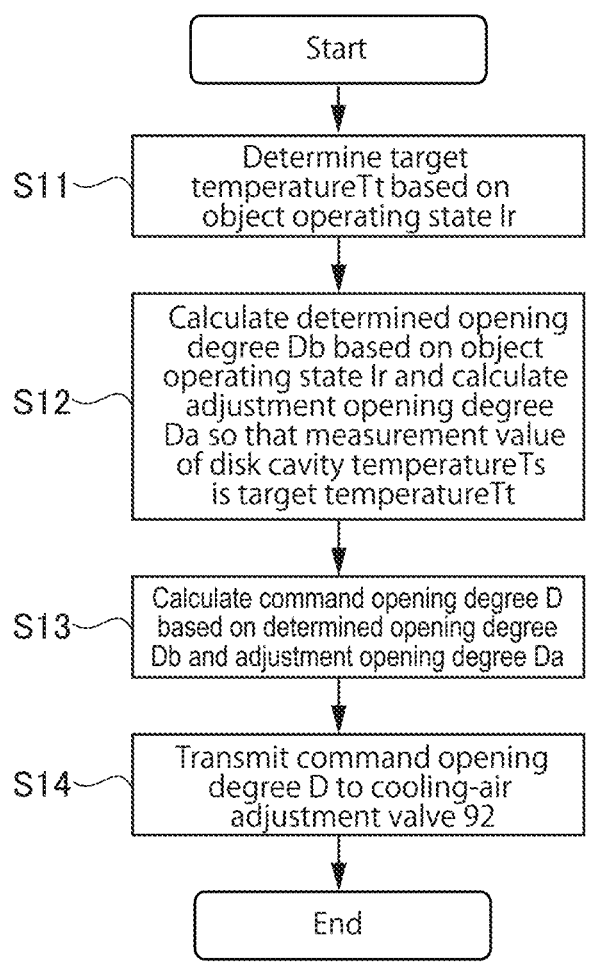
FIG. 14 is a diagram of a disk cavity temperature control method according to an embodiment of the present invention.

FIG. 14 is a diagram of the disk cavity temperature control method according to an embodiment of the present invention.

The disk cavity temperature control method is a method for controlling the disk cavity temperature by controlling the valve opening degree of the cooling-air adjustment valve 92. As shown in FIG. 14, the disk cavity temperature control method (hereinafter, simply, temperature control method) includes a target temperature determination step (S11), a valve opening degree determination step (S12), and a command opening degree calculation step (S13). The temperature control method may be performed by the temperature control device 1, or may be manually performed while periodically acquiring the object operating state Ir.

The temperature control method will be described in order of steps of FIG. 14.

In step S11 of FIG. 14, the target temperature determination step is performed. The target temperature determination step (S11) is a step of determining the target temperature Tt of the disk cavity temperature. Details of the target temperature determination step (S11) will not be described as it is the same as the process performed by the target temperature determination unit 11 as already described. In the embodiment shown in FIG. 14, the target temperature determination step (S11) determines the target temperature Tt, based on the object operating state Ir. More specifically, the target temperature Tt may be determined by the target temperature determination method described later.

In step S12, the valve opening degree determination step is performed. The valve opening degree determination step (S12) is a step of determining the valve opening degree of the cooling-air adjustment valve 92 such that the controlled disk cavity temperature is equal to or lower than the target temperature Tt determined by the target temperature determination step (S11). Details of the valve opening degree determination step (S12) will not be described as it is the same as the process performed by the valve opening degree determination unit 12 as already described. In the embodiment shown in FIG. 14, the valve opening degree determination step (S12) determines the determined opening degree Db, based on the object operating state Ir. More specifically, the determined opening degree Db may be determined by the valve opening degree determination method described later. Further, the valve opening degree determination step (S12) determines the adjustment opening degree Da such that the deviation between the target temperature Tt and the measurement value of the disk cavity temperature is zero, while the measurement value of the disk cavity is fed back.

In step S13, the command opening degree calculation step is performed. The command opening degree calculation step (S13) is a step of calculating the command opening degree D to the cooling-air adjustment valve 92, based on the valve opening degree determined by the valve opening degree determination step (S12). Details of the command opening degree calculation step (S13) will not be described as it is the same as the process performed by the valve opening degree determination unit 12 as already described. In the embodiment shown in FIG. 14, the command opening degree calculation step (S13) calculates the command opening degree D, based on the determined opening degree Db and the adjustment opening degree Da.

Then, in step S14, the command opening degree D calculated by the command opening degree calculation step (S13) is transmitted to the cooling-air adjustment valve 92.

Figure 15:
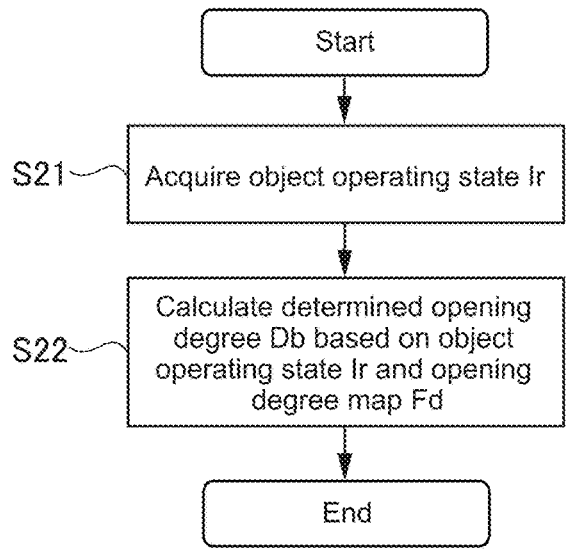
FIG. 15 is a diagram of a valve opening degree determination method for a cooling-air adjustment valve according to an embodiment of the present invention.

FIG. 15 is a diagram of the valve opening degree determination method for the cooling-air adjustment valve according to an embodiment of the present invention.

The valve opening degree determination method for the cooling-air adjustment valve is a method for determining the valve opening degree (determined opening degree Db) of the cooling-air adjustment valve 92. As shown in FIG. 15, the valve opening degree determination method for the cooling-air adjustment valve (hereinafter, simply, valve opening degree determination method) includes an object operating state acquisition step (S21) and a valve opening degree calculation step (S22). The valve opening degree determination method may be performed by the valve opening degree determination device 2, or may be manually performed while periodically acquiring the object operating state Ir.

The valve opening degree determination method will be described in order of steps of FIG. 15.

In step S21 of FIG. 15, the object operating state acquisition step is performed. The object operating state acquisition step (S21) is a step of acquiring the object operating state Ir. Details of the object operating state acquisition step (S21) will not be described as it is the same as the process performed by the object operating state acquisition unit 21 of the valve opening degree determination device 2 as already described.

In step S22 of FIG. 15, the valve opening degree calculation step is performed. The valve opening degree calculation step (S22) is a step of calculating the valve opening degree of the cooling-air adjustment valve 92 such that the disk cavity temperature after control is equal to or lower than the target temperature Tt, based on the object operating state Ir acquired by the object operating state acquisition step (S21). Details of the valve opening degree calculation step (S22) will not be described as it is the same as the process performed by the valve opening degree calculation unit 22 of the valve opening degree determination device 2 as already described. In the embodiment shown in FIG. 15, the valve opening degree calculation step (S22) calculates the determined opening degree Db, based on the object operating state Ir and the opening degree map Fd generated based on the prediction model Mt. More specifically, the valve opening degree calculation step (S22) may calculate the determined opening degree Db of the cooling-air adjustment valve 92 based on the first opening degree map Fda and the opening degree correction map Fdc.

Figure 16:
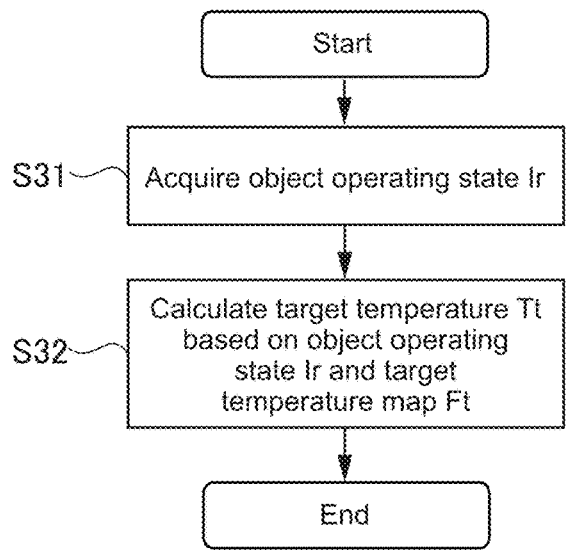
FIG. 16 is a diagram of a disk cavity target temperature method according to an embodiment of the present invention.

FIG. 16 is a diagram of the disk cavity target temperature method according to an embodiment of the present invention.

The disk cavity target temperature determination method is a method for determining the target temperature of the disk cavity temperature. As shown in FIG. 16, the disk cavity target temperature determination method (hereinafter, simply, target temperature determination method) includes an object operating state acquisition step (S31) and a target temperature calculation step (S32). The target temperature determination method may be performed by the target temperature determination device 3, or may be manually performed while periodically acquiring the object operating state Ir.

The target temperature determination method will be described in order of steps of FIG. 16.

In step S31 of FIG. 16, the object operating state acquisition step is performed. The object operating state acquisition step (S31) is a step of acquiring the object operating state Ir. Details of the object operating state acquisition step (S31) will not be described as it is the same as the process performed by the object operating state acquisition unit 31 of the target temperature determination device 3 as already described.

In step S32 of FIG. 16, the target temperature calculation step is performed. The target temperature calculation step (S32) is a step of calculating the target temperature Tt, based on the object operating state Ir acquired by the object operating state acquisition step (S31). Details of the target temperature calculation step (S32) will not be described as it is the same as the process performed by the target temperature calculation unit 32 of the target temperature determination device 3 as already described. In the embodiment shown in FIG. 16, the target temperature calculation step (S32) calculates the target temperature Tt, based on the object operating state Ir and the target temperature map Ft generated based on the classification model Mp. More specifically, the target temperature calculation step (S32) may calculate the target temperature Tt based on the first target temperature map Fta and the target temperature correction map Ftc.

The present invention is not limited to the embodiments described above, but includes modifications to the embodiments described above, and embodiments composed of combinations of those embodiments.

REFERENCE SIGNS LIST

1 Temperature control device (Disk cavity temperature control device)
m Storage device
11 Target temperature determination unit
12 Valve opening degree determination unit
13 Command opening degree calculation unit
14 Feedback control unit
15 Abnormality detection unit
17 Log collection unit
2 Valve opening degree determination device
21 Object operating state acquisition unit
22 Valve opening degree calculation unit
23 Opening degree map retention unit
24 Calculation unit
25 First opening degree map retention unit
26 Opening degree correction map retention unit
3 Target temperature determination device (Disk cavity target temperature determination device)
31 Object operating state acquisition unit
32 Target temperature calculation unit
33 Target temperature map retention unit
34 Calculation unit
35 First target temperature map retention unit
36 Target temperature correction map retention unit
4 Prediction model construction device
4m Storage device
41 Previous data storage unit
41e Selective management history storage unit
41n Normal management history storage unit
42 Prediction model construction unit
43 Opening degree search unit
44 Target temperature search unit
45 Opening degree correction map generation unit
45b Target temperature correction map generation unit
46 First opening degree map retention unit
46b First target temperature map retention unit
47 Opening degree correction map calculation unit
47b Target temperature correction map calculation unit
48 Transmission unit
49 Verification unit
5 Previous data generation unit
51 Operating history data acquisition unit
52 Operating history classification unit
53 Selective management history processing unit
54e Second management area identification unit
54 Management area identification unit
55 Normal operating history processing unit
56 Data number management unit
56e Second data number management unit
6 Communication network
7 Gas turbine
7i Air inlet 7s Rotor shaft
7r Rotor
71 Compressor
71c Compressor casing
71r Compressor-side rotor portion
71m Rotor blade (on compressor side)
71s Stator vane (on compressor side)
72 Combustor
73 Turbine
73c Turbine casing
73r Turbine-side rotor portion
73m Rotor blade (on turbine side)
73s Stator vane (on turbine side)
73a Tip end portion of stator vane
73d Turbine disk
74 Bearing
75 Inlet guide vane
75c Opening degree controller
76 Extraction chamber
77p Pressure gauge
77t Intake thermometer
78 Generator
78e Electricity meter
79 Thermometer
9 Turbine cooling system
91 Extraction pipe
92 Cooling-air adjustment valve
C Cooling air
D Command opening degree
Da Adjustment opening degree
Db Determined opening degree
Dr Actual opening degree
F Map
Fc Correction map
Fd Opening degree map
Fda First opening degree map
Fdb Second opening degree map
Fdc Opening degree correction map
Ft Target temperature map
Fta First target temperature map
Ftb Second target temperature map
Ftc Target temperature correction map
Ir Object operating state
L Previous data
Lc Operating history data
Lce Selective management data
Lcn Normal management data
M Prediction model
MW Generator output
Mp Classification model
Mt Prediction model
S Disk cavity
Ta Intake air temperature
Ts Disk cavity temperature
Tt Target temperature
Vp Vane opening degree of inlet guide vane

The invention claimed is:

1. A valve opening degree determination device for a cooling-air adjustment valve for determining a valve opening degree of the cooling-air adjustment valve for controlling supply of a cooling air for cooling a disk cavity of a gas turbine, the valve opening degree determination device comprising:
a non-transitory memory configured to store at least one program; and
a hardware processor configured to execute the at least one program and control the valve opening degree determination device to:
acquire an object operating state which is an operating state of the gas turbine before control;
calculate the valve opening degree such that a disk cavity temperature which is a temperature of the disk cavity after control is equal to or lower than a target temperature, based on the object operating state; and
control the valve opening degree of the cooling-air adjustment valve based on the opening degree calculated,
wherein the valve opening degree determination device is configured to determine an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and the input value of the valve opening degree, the prediction model being generated based on a plurality of previous data in which the operating state, the disk cavity temperature, and an actual opening degree of the cooling-air adjustment valve previously acquired are associated with each other.

2. The valve opening degree determination device for the cooling-air adjustment valve according to claim 1,
wherein the hardware processor is further configured to execute the at least one program and control the valve opening degree determination device to:
retain an opening degree map defining the valve opening degree that allows the prediction value of the disk cavity temperature to be equal to or lower than the target temperature for each operating state, the opening degree map being generated based on the prediction model; and
calculate the valve opening degree based on the object operating state and the opening degree map.

3. The valve opening degree determination device for the cooling-air adjustment valve according to claim 2,
wherein the hardware processor is further configured to execute the at least one program and control the valve opening degree determination device to:
retain a first opening degree map which is the opening degree map generated at a reference time; and
retain an opening degree correction map indicating a difference between the first opening degree map and a second opening degree map which is the opening degree map generated after the reference time, and
wherein the valve opening degree determination device is configured to calculate the valve opening degree, based on the first opening degree map and the opening degree correction map.

4. The valve opening degree determination device for the cooling-air adjustment valve according to claim 1,
wherein the prediction model is generated by learning the plurality of previous data.

5. The valve opening degree determination device for the cooling-air adjustment valve according to claim 1,
wherein the prediction model is a probability distribution model for obtaining the prediction value of the disk cavity temperature based on probability distribution, and a probability that the prediction value based on the probability distribution is equal to or higher than the target temperature does not exceed a predetermined probability.

6. The valve opening degree determination device for the cooling-air adjustment valve according to claim 1, wherein the hardware processor is further configured to execute the at least one program and control the valve opening degree determination device to:
generate the plurality of previous data;
store, in a previous data storage, the plurality of previous data generated;
store, in a selective management history storage, selective management data which is operating history data as a candidate of the plurality of previous data and has data of the disk cavity temperature exceeding a temperature limit of the disk cavity temperature; and
store, in a normal management history storage, normal management data which is operating history data other than the selective management data.

7. The valve opening degree determination device for the cooling-air adjustment valve according to claim 6,
wherein the hardware processor is further configured to execute the at least one program and control the valve opening degree determination device to:
acquire the operating history data;
record the selective management data in the selective management history storage;
record the normal management data in the normal management history storage;
identify a management area of the selective management history storage in which the selective management data is to be stored, or identify a management area of the normal management history storage in which the normal management data is to be stored, based on at least one data of the disk cavity temperature or the operating state included in at least one of the selective management data or the normal management data; and
manage the number of at least one of the selective management data or the normal management data in each management area to a predetermined number or less from latest data.

8. The valve opening degree determination device for the cooling-air adjustment valve according to claim 7,
wherein if the operating history data being the selective management data or the normal management data whose management area is identified satisfies a predetermined data addition condition, the valve opening degree determination device is configured to record the operating history data satisfying the predetermined data addition condition in the previous data storage, and
wherein the data addition condition includes that the management area storing first operating history data is different from the management area of second operating history data acquired within a predetermined time or n-th acquisition after the first operating history data is acquired, where n is an integer.

9. The valve opening degree determination device for the cooling-air adjustment valve according to claim 7, wherein the hardware processor is further configured to execute the at least one program and control the valve opening degree determination device to:
perform feedback control to determine an adjustment opening degree for adjusting the valve opening degree, based on a deviation between the target temperature and a measurement value of the disk cavity temperature,
wherein the valve opening degree determination device is configured to allow only the operating history data acquired when the target temperature settles and the feedback control settles to pass through, and
acquire the operating history data that has passed through a setting filter.

10. The valve opening degree determination device for the cooling-air adjustment valve according to claim 1,
wherein the operating state includes at least one of a vane opening degree of an inlet guide vane, an intake air temperature, an output power, or a pressure in a compressor casing.

11. A disk cavity target temperature determination device for determining a target temperature of a disk cavity temperature which is a temperature of a disk cavity of a gas turbine used for determining a valve opening degree of a cooling-air adjustment valve for controlling supply of a cooling air for cooling the disk cavity, the disk cavity target temperature determination device comprising:
a non-transitory memory configured to store at least one program; and
a hardware processor configure to execute the at least one program and control the disk cavity target temperature determination device to:
acquire an object operating state which is an operating state of the gas turbine before control;
calculate the target temperature, based on the object operating state; and
control the valve opening degree of the cooling-air adjustment valve based on the target temperature calculated,
wherein the disk cavity target temperature determination device is configured to determine an input value of the disk cavity temperature such that a loss-of-control probability of the gas turbine in the object operating state is equal to or lower than a predetermined probability as the target temperature, based on a classification model for obtaining the loss-of-control probability with an input value of the operating state and the input value of the disk cavity temperature, the classification model being generated based on a plurality of previous data in which controllability of the gas turbine is associated with the operating state and the disk cavity temperature previously acquired.

12. The disk cavity target temperature determination device according to claim 11,
wherein the hardware processor is further configured to execute the at least one program and control the disk cavity target temperature determination device to:
retain a target temperature map defining the target temperature that allows the loss-of-control probability to be equal to or lower than the predetermined probability for each operating state, the target temperature map being generated based on the classification model; and
calculate the target temperature based on the object operating state and the target temperature map.

13. The disk cavity target temperature determination device according to claim 12,
wherein the hardware processor is further configured to execute the at least one program and control the disk cavity target temperature determination device to:
retain a first target temperature map which is the target temperature map generated at a reference time; and
retain a target temperature correction map indicating a difference between the first target temperature map and a second target temperature map which is the target temperature map generated after the reference time, and wherein the disk cavity target temperature determination device is configured to calculate the target temperature, based on the first target temperature map and the target temperature correction map.

14. The disk cavity target temperature determination device according to claim 11,
wherein the classification model is generated by learning the plurality of previous data.

15. The disk cavity target temperature determination device according to claim 11, wherein the hardware processor is further configured to execute the at least one program and control the disk cavity target temperature determination device to:
generate the plurality of previous data; and
store, in a previous data storage, the plurality of previous data generated by the previous data generation unit;
store, in a selective management history storage, selective management data which is operating history data as a candidate of the plurality of previous data and has data of the disk cavity temperature exceeding a temperature limit of the disk cavity temperature; and
store, in a normal management history storage, normal management data which is operating history data other than the selective management data.

16. The disk cavity target temperature determination device according to claim 15,
wherein the hardware processor is further configured to execute the at least one program and control the disk cavity target temperature determination device to:
acquire operating history data which is a candidate of the plurality of previous data;
record the selective management data in the selective management history storage;
record the normal management data in the normal management history storage;
identify a management area of the selective management history storage in which the selective management data is to be stored, or identify a management area of the normal management history storage in which the normal management data is to be stored, based on at least one data of the disk cavity temperature or the operating state included in at least one of the selective management data or the normal management data; and
manage the number of at least one of the selective management data or the normal management data in each management area to a predetermined number or less from latest data.

17. The disk cavity target temperature determination device according to claim 16,
wherein the disk cavity target temperature determination device is configured to, if the operating history data being the selective management data or the normal management data whose management area is identified satisfies a predetermined data addition condition, record the operating history data satisfying the predetermined data addition condition in the previous data storage, and
wherein the data addition condition includes that the management area storing first operating history data is different from the management area of second operating history data acquired within a predetermined time or n-th acquisition after the first operating history data is acquired, where n is an integer.

18. The disk cavity target temperature determination device according to claim 11,
wherein the operating state includes at least one of a vane opening degree of an inlet guide vane, an intake air temperature, an output power, or a pressure in a compressor casing.

19. A disk cavity temperature control device for controlling a disk cavity temperature which is a temperature of a disk cavity of a gas turbine by controlling a valve opening degree of a cooling-air adjustment valve for controlling supply of a cooling air for cooling the disk cavity, the disk cavity temperature control device comprising:
a non-transitory memory configured to store at least one program; and
a hardware processor configure to execute the at least one program and control the disk cavity temperature control device to:
determine a target temperature of the disk cavity temperature, based on an object operating state which is an operating state of the gas turbine before control;
determine the valve opening degree such that the disk cavity temperature after control is equal to or lower than the target temperature, based on the object operating state;
calculate a command opening degree to the cooling-air adjustment valve, based on a determined opening degree; and
perform a first control to control the valve opening degree of the cooling-air adjustment valve based on the command opening degree calculated,
wherein the target temperature is lower than a temperature limit of the disk cavity temperature, and
wherein the disk cavity temperature control device is configured to control the valve opening degree of the cooling-air adjustment valve so as to be the valve opening degree determined by a valve opening degree determination device, the hardware processor being further configured to execute the at least one program and perform operations of the valve opening degree determination device comprising:
acquire the object operating state; and
calculate the valve opening degree such that the disk cavity temperature which is the temperature of the disk cavity after control is equal to or lower than a target temperature, based on the object operating state; and
perform a second control to control the valve opening degree of the cooling-air adjustment valve based on the valve opening degree calculated,
wherein the disk cavity temperature control device is configured to determine an input value of the valve opening degree such that a prediction value of the disk cavity temperature in the object operating state is equal to or lower than the target temperature as the valve opening degree, based on a prediction model for obtaining the prediction value of the disk cavity temperature with the input value of the operating state and an input value of the valve opening degree, the prediction model being generated based on a plurality of previous data in which the operating state, the disk cavity temperature, and an actual opening degree of the cooling-air adjustment valve previously acquired are associated with each other.

20. A disk cavity temperature control device for controlling a disk cavity temperature which is a temperature of a disk cavity of a gas turbine by controlling a valve opening degree of a cooling-air adjustment valve for controlling supply of a cooling air for cooling the disk cavity, the disk cavity temperature control device comprising:

a non-transitory memory configured to store at least one program; and
a hardware processor configure to execute the at least one program and control the disk cavity temperature control device to:
determine a target temperature of the disk cavity temperature, based on an object operating state which is an operating state of the gas turbine before control;
determine the valve opening degree such that the disk cavity temperature after control is equal to or lower than the target temperature, based on the object operating state;
calculate a command opening degree to the cooling-air adjustment valve, based on a determined opening degree; and
control the valve opening degree of the cooling-air adjustment valve based on the command opening degree calculated,
wherein the disk cavity temperature control device is configured to determine a temperature determined by a disk cavity target temperature determination device as the target temperature,
the hardware processor being further configured to execute the at least one program and perform operations of the disk cavity target temperature determination device comprising:
acquire the object operating state; and
calculate the target temperature, based on the object operating state,
wherein the disk cavity temperature control device is configured to determine an input value of the disk cavity temperature such that a loss-of-control probability of the gas turbine in the object operating state is equal to or lower than a predetermined probability as the target temperature, based on a classification model for obtaining the loss-of-control probability with an input value of the operating state and the input value of the disk cavity temperature, the classification model being generated based on a plurality of previous data in which controllability of the gas turbine is associated with the operating state and the disk cavity temperature previously acquired.

21. A valve opening degree determination method implemented by a valve opening degree determination device for a cooling-air adjustment valve for determining a valve opening degree of the cooling-air adjustment valve for controlling supply of a cooling air for cooling a disk cavity of a gas turbine, the valve opening degree determination device including a non-transitory memory configured to store at least one program and a hardware processor configured to execute the at least one program and control the valve opening degree determination device to perform the valve opening degree determination method comprising:
acquiring an object operating state which is an operating state of the gas turbine before control;
calculating the valve opening degree such that a disk cavity temperature which is a temperature of the disk cavity after control is equal to or lower than a target temperature, based on the object operating state; and
controlling the valve opening degree of the cooling-air adjustment valve based on the valve opening degree calculated,
wherein the calculating of the valve opening degree includes determining an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and the input value of the valve opening degree, the prediction model being generated based on a plurality of previous data in which the operating state, the disk cavity temperature, and an actual opening degree of the cooling-air adjustment valve previously acquired are associated with each other.

22. The valve opening degree determination method for the cooling-air adjustment valve according to claim 21, further comprising:
determining an adjustment opening degree for adjusting the valve opening degree, based on a deviation between the target temperature and a measurement value of the disk cavity temperature.

23. A disk cavity target temperature determination method implemented by a disk cavity target temperature determination device for determining a target temperature of a disk cavity temperature which is a temperature of a disk cavity of a gas turbine used for determining a valve opening degree of a cooling-air adjustment valve for controlling supply of a cooling air for cooling the disk cavity, the disk cavity target temperature determination device including a non-transitory memory configured to store at least one program and a hardware processor configured to execute the at least one program and control the valve opening degree determination device to perform the disk cavity target temperature determination method comprising:
acquiring an object operating state which is an operating state of the gas turbine before control;
calculating the target temperature, based on the object operating state; and
controlling the valve opening degree of the cooling-air adjustment valve based on the target temperature calculated,
wherein the calculating of the target temperature includes determining an input value of the disk cavity temperature such that a loss-of-control probability of the gas turbine in the object operating state is equal to or lower than a predetermined probability as the target temperature, based on a classification model for obtaining the loss-of-control probability with an input value of the operating state and the input value of the disk cavity temperature, the classification model being generated based on a plurality of previous data in which controllability of the gas turbine is associated with the operating state and the disk cavity temperature previously acquired.

24. A non-transitory computer-readable recording medium storing a valve opening degree determination program for a cooling-air adjustment valve for determining a valve opening degree of the cooling-air adjustment valve for controlling supply of a cooling air for cooling a disk cavity of a gas turbine, the valve opening degree determination program when executed by a computer causes the computer to execute steps comprising:
acquiring an object operating state which is an operating state of the gas turbine before control;
calculating the valve opening degree such that a disk cavity temperature which is a temperature of the disk cavity after control is equal to or lower than a target temperature, based on the object operating state; and
controlling the valve opening degree of the cooling-air adjustment valve based on the valve opening degree calculated, wherein the calculating of the valve opening degree determines an input value of the valve opening degree such that a prediction value of the disk cavity temperature in the object operating state is equal to or lower than the target temperature as the valve opening degree, based on a prediction model for obtaining the prediction value of the disk cavity temperature with an input value of the operating state and the input value of the valve opening degree, the prediction model being generated based on a plurality of previous data in which the operating state, the disk cavity temperature, and an actual opening degree of the cooling-air adjustment valve previously acquired are associated with each other.

25. A non-transitory computer-readable recording medium storing a disk cavity target temperature determination program for determining a target temperature of a disk cavity temperature which is a temperature of a disk cavity of a gas turbine used for determining a valve opening degree of a cooling-air adjustment valve for controlling supply of a cooling air for cooling the disk cavity, the disk cavity target temperature determination program when executed by a computer causes the computer to execute steps comprising:

acquiring an object operating state which is an operating state of the gas turbine before control;

calculating the target temperature, based on the object operating state; and controlling the valve opening degree of the cooling-air adjustment valve based on the target temperature calculated, wherein the calculating of the target temperature determines an input value of the disk cavity temperature such that a loss-of-control probability of the gas turbine in the object operating state is equal to or lower than a predetermined probability as the target temperature, based on a classification model for obtaining the loss-of-control probability with an input value of the operating state and the input value of the disk cavity temperature, the classification model being generated based on a plurality of previous data in which controllability of the gas turbine is associated with the operating state and the disk cavity temperature previously acquired.

* * * * *